(12) United States Patent
Inamdar et al.

(10) Patent No.: US 11,988,903 B2
(45) Date of Patent: May 21, 2024

(54) PHOTONIC INTEGRATED CIRCUIT-BASED OPTICAL PHASED ARRAY CALIBRATION TECHNIQUE

(71) Applicant: Raytheon Company, Waltham, MA (US)

(72) Inventors: Niraj K. Inamdar, Rolling Hills Estates, CA (US); Stephen P. Palese, Redondo Beach, CA (US); Aaron B. Potter, Torrance, CA (US); Thomas R. Yengst, Boise, ID (US)

(73) Assignee: Raytheon Company, Tewksbury, MA (US)

( * ) Notice: Subject to any disclaimer, the term of this patent is extended or adjusted under 35 U.S.C. 154(b) by 677 days.

(21) Appl. No.: 17/174,197

(22) Filed: Feb. 11, 2021

(65) Prior Publication Data

US 2022/0252908 A1 Aug. 11, 2022

(51) Int. Cl.
*G02F 1/01* (2006.01)
*G01N 21/88* (2006.01)
(Continued)

(52) U.S. Cl.
CPC ....... *G02F 1/0147* (2013.01); *G01N 21/8806* (2013.01); *G02F 1/292* (2013.01); *H01Q 3/267* (2013.01); *H01Q 3/2676* (2013.01); *H04B 10/11* (2013.01); *H04B 10/112* (2013.01); *G02F 2203/50* (2013.01); *H04B 10/40* (2013.01)

(58) Field of Classification Search
CPC .............. G02F 1/0147; G02F 2203/50; G01N 21/8806; H01Q 3/267; H01Q 3/2676; H04B 10/11; H04B 10/40
See application file for complete search history.

(56) References Cited

U.S. PATENT DOCUMENTS 3,975,628 A    8/1976   Graves et al.
7,408,507 B1 *   8/2008   Paek ................... H01Q 15/0053
                                                                                     342/368
(Continued)

FOREIGN PATENT DOCUMENTS

EP         3761528 A1     1/2021
JP     2011-060982 A     3/2011

OTHER PUBLICATIONS

Non-Final Office Action dated Aug. 18, 2023 in connection with U.S. Appl. No. 17/162,860, 24 pages.
(Continued)

*Primary Examiner* — Pranesh K Barua

(57) ABSTRACT

A method includes generating a mixed optical beam using an optical phased array that includes multiple array elements, where each array element includes an antenna element and a phase modulator. The mixed optical beam includes a combination of (i) an output optical beam produced by the optical phased array and (ii) a reference optical beam. The method also includes capturing near-field measurements of the mixed optical beam, where the near-field measurements are captured while scanning phase angles of the phase modulators. The method further includes generating calibration data based on the near-field measurements, where the calibration data identifies phase and amplitude responses of the array elements. In addition, the method includes storing the calibration data.

20 Claims, 13 Drawing Sheets

(51) Int. Cl.
*G02F 1/29* (2006.01)
*H01Q 3/26* (2006.01)
*H04B 10/11* (2013.01)
*H04B 10/112* (2013.01)
*H04B 10/40* (2013.01)

(56) References Cited

U.S. PATENT DOCUMENTS

| | | |
|---|---|---|
| 7,729,572 B1 | 6/2010 | Pepper et al. |
| 7,949,030 B2 | 5/2011 | Volodin |
| 8,068,235 B1 | 11/2011 | Marron et al. |
| 10,790,909 B1 | 9/2020 | Suni |
| 10,838,222 B2 | 11/2020 | Khachaturian et al. |
| 11,029,465 B1 | 6/2021 | Rakowski et al. |
| 11,102,426 B1 | 8/2021 | Kendrick et al. |
| 2006/0239312 A1 | 10/2006 | Kewitsch et al. |
| 2015/0262905 A1 | 9/2015 | Salamon |
| 2015/0293224 A1 | 10/2015 | Eldada et al. |
| 2015/0378241 A1 | 12/2015 | Eldada |
| 2016/0013866 A1 | 1/2016 | Doerr |
| 2016/0094016 A1 | 3/2016 | Beach et al. |
| 2017/0234984 A1 | 8/2017 | Khial et al. |
| 2017/0324162 A1 | 11/2017 | Khachaturian et al. |
| 2018/0039154 A1 | 2/2018 | Hashemi et al. |
| 2018/0107091 A1 | 4/2018 | Hosseini et al. |
| 2019/0072730 A1 | 3/2019 | Baehr-Jones et al. |
| 2019/0260123 A1* | 8/2019 | Poulton ............ H04B 10/25753 |
| 2019/0260124 A1 | 8/2019 | Davoyan et al. |
| 2020/0150346 A1 | 5/2020 | Cavaliere et al. |
| 2020/0192179 A1* | 6/2020 | Hajimiri ............ G02B 6/29313 |
| 2020/0284910 A1 | 9/2020 | Yaacobi et al. |
| 2020/0409229 A1 | 12/2020 | Morton et al. |
| 2021/0063776 A1 | 3/2021 | Larson et al. |
| 2021/0067251 A1 | 3/2021 | Park et al. |
| 2021/0149227 A1 | 5/2021 | Lee et al. |
| 2021/0364695 A1 | 11/2021 | Shin et al. |
| 2022/0099893 A1 | 3/2022 | Paudel et al. |
| 2022/0137295 A1 | 5/2022 | Grillanda et al. |

OTHER PUBLICATIONS

Abediasl et al., "Monolithic optical phased-array transceiver in a standard SOI CMOS process", Optics Express, vol. 23, No. 5, Mar. 2015, 11 pages.
Office Action dated Sep. 16, 2021 in connection with U.S. Appl. No. 17/174,132, 18 pages.
Notice of Allowance dated Aug. 17, 2022 in connection with U.S. Appl. No. 17/174,180, 10 pages.
Notice of Allowance dated Jun. 23, 2022 in connection with U.S. Appl. No. 17/174,132, 16 pages.
Creedon et al., "High efficiency coherent beam combining of semiconductor optical amplifiers," Optics Letters, vol. 37, No. 23, Dec. 2012, 3 pages.
Fatemi et al., "A Nonuniform Sparse 2-D Large-FOV Optical Phased Array With a Low-Power PWM Drive," IEEE Journal of Solid-State Circuits, vol. 54, Issue 5, May 2019, 16 pages.
Heidel et al., "A Review of Electronic-Photonic Heterogeneous Integration at DARPA," IEEE Journal of Selected Topics in Quantum Electronics, vol. 22, No. 6, Nov. 2016, 9 pages.
Kim et al., "A Single-Chip Optical Phased Array in a Wafer-Scale Silicon Photonics / CMOS 3D-Integration Platform," IEEE Journal of Solid-State Circuits, vol. 54, Issue 11, Nov. 2019, 14 pages.
Komljenovic et al., "On-chip calibration and control of optical phased arrays," Optics Express, vol. 26, No. 3, Jan. 2018, 12 pages.
Larocque et al., "Beam steering with ultracompact and low-power silicon resonator phase shifters," Optics Express, vol. 27, No. 24, Nov. 2019, 16 pages.
Li et al., "Fast Optical Phased Array Calibration Technique for Random Phase Modulation LiDAR," IEEE Photonics Journal, vol. 11, No. 1, Feb. 2019, 10 pages.
Marron et al., "Atmospheric turbulence correction using digital holographic detection: experimental results," Optics Express, vol. 17, No. 14, Jul. 2009, 14 pages.
Marron et al., "Extended-range digital holographic imaging," Proc. of SPIE, vol. 7684 76841J, 2010, 6 pages.
Mehta et al., "An Optically Sampled ADC in 3D Integrated Silicon-Photonics/65nm CMOS," IEEE 2020 Symposium on VLSI Technology Digest of Technical Papers—THL.3, 2020, 2 pages.
Orcutt et al., "Open foundry platform for high-performance electronic-photonic integration," Optics Express, vol. 20, No. 11, May 2012, 11 pages.
Sayyah et al., "Two-dimensional pseudo-random optical phased array based on tandem optical injection locking of vertical cavity surface emitting lasers," Optics Express, vol. 23, No. 15, Jul. 2015, 12 pages.
Zhang et al., "Phase Calibration of On-Chip Optical Phased Arrays via Interference Technique," IEEE Photonics Journal, vol. 12, No. 2, Apr. 2020, 11 pages.
Kendrick et al., "Photonic Integrated Circuit Distance Measuring Interferometer," U.S. Appl. No. 16/929,907, filed Jul. 15, 2020, 35 pages.
Yengst et al., "Digital Input Circuit Design for Photonic Integrated Circuit," U.S. Appl. No. 17/174,173, filed Feb. 11, 2021, 59 pages.
Palese et al., "Photonic Integrated Circuit-Based Communication Transmit/Receive System," U.S. Appl. No. 17/174,132, filed Feb. 11, 2021, 61 pages.
Palese et al., "Photonic Integrated Circuit-Based Coherently Phased Array Laser Transmitter," U.S. Appl. No. 17/162,860, filed Jan. 29, 2021, 35 pages.
Kendrick et al., "Photonic Integrated Circuit-Based Optical Phased Array Phasing Technique," U.S. Appl. No. 17/174,180, filed Feb. 11, 2021, 60 pages.
International Search Report and Written Opinion of the International Searching Authority dated Feb. 24, 2022 in connection with International Patent Application No. PCT/US2021/059421, 16 pages.
International Search Report and Written Opinion of the International Searching Authority dated Apr. 8, 2022 in connection with International Patent Application No. PCT/US2021/064527, 10 pages.
Office Action dated Apr. 13, 2022, in connection with U.S. Appl. No. 17/174,132, 20 pages.
Blumenthal, "Silicon Nitride in Silicon Photonics," Proceedings of the IEEE, vol. 106, No. 12, Dec. 2018, 23 pages.
He et al., "Review of Photonic Integrated Optical Phased Arrays for Space Optical Communication," IEEE Access, vol. 8, Oct. 2020, 16 pages.

* cited by examiner ptions, and claims.

PHOTONIC INTEGRATED CIRCUIT-BASED OPTICAL PHASED ARRAY CALIBRATION TECHNIQUE

TECHNICAL FIELD

This disclosure relates generally to communication systems. More specifically, this disclosure relates to a photonic integrated circuit-based optical phased array calibration technique.

BACKGROUND

Next-generation optical phased arrays (OPAs) are being designed using photonic integrated circuits (PICs). A photonic integrated circuit refers to a device that integrates multiple photonic or light-based functions into the device. Transmitting OPAs utilize antenna elements to form transmitted optical beams, where phases associated with the antenna elements can be controlled or adjusted to perform beam shaping and/or beam pointing. Receiving OPAs also utilize antenna elements to receive incoming optical beams. Arrays used for transmitting and receiving can utilize antenna elements for both types of functions.

SUMMARY

This disclosure relates to a photonic integrated circuit-based optical phased array calibration technique.

In a first embodiment, a method includes generating a mixed optical beam using an optical phased array that includes multiple array elements, where each array element includes an antenna element and a phase modulator. The mixed optical beam includes a combination of (i) an output optical beam produced by the optical phased array and (ii) a reference optical beam. The method also includes capturing near-field measurements of the mixed optical beam, where the near-field measurements are captured while scanning phase angles of the phase modulators. The method further includes generating calibration data based on the near-field measurements, where the calibration data identifies phase and amplitude responses of the array elements. In addition, the method includes storing the calibration data.

In a second embodiment, an apparatus includes at least one processor configured to capture near-field measurements of a mixed optical beam generated using an optical phased array that includes multiple array elements, where each array element includes an antenna element and a phase modulator. The mixed optical beam includes a combination of (i) an output optical beam produced by the optical phased array and (ii) a reference optical beam, and the near-field measurements are captured while scanning phase angles of the phase modulators. The at least one processor is also configured to generate calibration data based on the near-field measurements, where the calibration data identifies phase and amplitude responses of the array elements. The at least one processor is further configured to store the calibration data.

In a third embodiment, a non-transitory computer readable medium contains instructions that when executed cause at least one processor to capture near-field measurements of a mixed optical beam generated using an optical phased array that includes multiple array elements, where each array element includes an antenna element and a phase modulator. The mixed optical beam includes a combination of (i) an output optical beam produced by the optical phased array and (ii) a reference optical beam, and the near-field measurements are captured while scanning phase angles of the phase modulators. The medium also contains instructions that when executed cause the at least one processor to generate calibration data based on the near-field measurements, where the calibration data identifies phase and amplitude responses of the array elements. The medium further contains instructions that when executed cause the at least one processor to store the calibration data.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
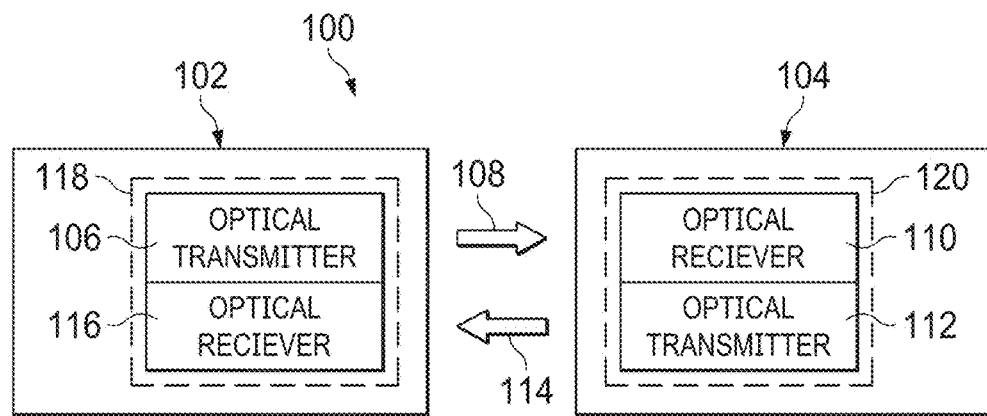
FIG. 1 illustrates an example system supporting photonic integrated circuit-based communication according to this disclosure.

FIGS. 1 through 17, described below, and the various embodiments used to describe the principles of the present disclosure are by way of illustration only and should not be construed in any way to limit the scope of this disclosure. Those skilled in the art will understand that the principles of the present disclosure may be implemented in any type of suitably arranged device or system.

As noted above, next-generation optical phased arrays (OPAs) are being designed using photonic integrated circuits (PICs). Transmitting OPAs utilize antenna elements to form transmitted optical beams, where phases associated with the antenna elements can be controlled or adjusted to perform beam shaping and/or beam pointing.

Receiving OPAs also utilize antenna elements to receive incoming optical beams. Arrays used for transmitting and receiving can utilize antenna elements for both types of functions. The antenna elements and various other components of or associated with an OPA can be implemented using one or more PICs.

In a first aspect of this disclosure, a compact design is provided to support a PIC-based communication transmit/receive system. As described in more detail below, the compact design may include laser transmitter, waveguide circuitry, and detector elements, all of which may be implemented within a common PIC package. For example, the compact design may include various elements, subassemblies, and systems supporting a fully PIC-based free space optical (FSO) laser communication terminal or other communication terminal. In some cases, the components of the system can include multiple-material PICs and other components that are "flip-chip" bonded or otherwise coupled together to form an integrated laser communication transmit/receive module or other communication module. The compact design can be provided in various configurations to support different space-, air-, and ground-based systems.

In some embodiments, the compact design includes a front end, an OPA, and a receiver, all of which may be implemented on a single integrated chip. The front end may use silicon elements and optionally indium phosphide (InP), gallium arsenide (GaAs), or other elements to integrate optical, electro-optical, and electronic functionalities (such as a source laser with modulators and semiconductor optical amplifiers (SOAs)) into the optical equivalent of a microelectronic circuit. In some cases, the front end supports a source-coherent combination of SOAs with sufficient bandwidth (such as about 3 GHz or more) to utilize electrically-efficient amplifiers. Also, on-chip phase control may be provided with integrated complementary metal oxide semiconductor (CMOS) or other silicon-based electronics. In addition, power scaling can be used to achieve desired power levels (such as about 10 W or more), which in some instances may be accomplished using chip-to-chip distributed multi-waveguide-to-waveguide coupling.

The OPA may include a two-dimensional (2D) array of silicon nano-antenna elements or other antenna elements, where relative phases of the antenna elements can be electronically controlled to support high-speed non-mechanical beam forming and beam steering. The array of antenna elements can also support features such as high slew rates, little or no induced disturbances, multi-node access, adaptive optics compensation, production scalability, and improved cost. In some cases, the array can support a unit cell architecture with low-power resonant micro-rings or other modulators so that each antenna element can be independently calibrated and controlled. If desired, a supercell design (which logically groups multiple antenna elements and related components into multiple supercells) can help provide routing simplicity and enable scalability in size. Also, in some cases, amplitude modulation of each supercell may be used to provide Taylor-weighted transmission with optimal optical power efficiency or to otherwise provide for control of the transmit power. Further, on-chip active calibration may be used to compensate for environmental factors. In addition, time-delay compensation may be very precisely controlled, such as to within one-tenth of the optical communication bandwidth.

The receiver may include one or more fiber-coupled photodiodes, avalanche photodiodes, or silicon-based, InP-based, or other circuits. The receiver may be used to process optical signals received by the OPA in order to recover information. In some cases, the receiver may operate as a coherent receiver with an active laser source for local oscillator heterodyne mixing. For example, the receiver may support frequency and phase locking of a local oscillator and a reference frequency to accommodate Doppler-shifted signals for coherent reception.

This type of design may have various advantages or benefits depending on the implementation. For example, some embodiments of this design support multi-access multi-node crosslinks at terrestrial fiber communication network data rates. Some embodiments of this design allow for fast slew rates over a full angular field of regard (FOR) to support in-plane, cross-plane, and space-ground full duplex communication links. Some embodiments of this design support inertia-less beam control with little or no exported disturbances to a host. Some embodiments of this design can compensate for atmospheric distortions to provide large data rate increases. Some embodiments of this design allow for fabrication using semiconductor wafer scale manufacturing processes, which can provide cost-effective and rapid-volume production. Some embodiments of this design are waveform-agnostic and can support one or both of coherent detection and direct detection. Some embodiments of this design allow for flexible use of transmit and receive wavelengths, which may support compatibility with inter-operability standards or use of non-standard communications (such as for covert applications). Some embodiments of this design provide large size and weight reductions with respect to current state-of-the-art pulsed erbium-doped fiber amplifier-based transmitter sources. Some embodiments of this design allow for large reductions in photon-per-information bit requirements for coherent versus direct detection receiver architectures.

In a second aspect of this disclosure, the electrical interface for an optical phased array designed with one or more photonic integrated circuits may be very important to the overall performance of the array. This disclosure provides a digital read in integrated circuit (DRIIC) design that can be tailored to the unique characteristics of optical phased arrays. Rather than using large break-out circuit boards and digital-to-analog converters, the DRIIC design can have a low profile and support operations such as flip-chip bonding to a photonic integrated circuit. In some cases, the DRIIC design integrates all PIC-related electronic controls into a hybridized or monolithic design. Also, the DRIIC design may support a unit cell architecture, where each DRIIC unit cell corresponds to and interacts with a corresponding PIC unit cell. This supports scalability of the PIC design as well as the DRIIC design to any suitable size. Overall, the DRIIC design helps to support various functions, such as beam forming and beam steering, in compact packages.

In a third aspect of this disclosure, phase modulations provided by modulators of a PIC-based OPA can be controlled to provide the desired phasing of the OPA. This disclosure provides a PIC-based OPA phasing technique that uses digital holography to support phasing of large numbers of array elements (such as up to around one million array elements or more). As described in more detail below, digital holography can be performed in the far-field, and a local oscillator (such as an additional antenna element) can be provided on the photonic integrated circuit but separate from the array elements. The use of digital holography allows for phasing control of all elements of the array with one measurement (as opposed to addressing each element individually). As a result, this technique provides phasing information for all array elements, and the phasing information can be applied in parallel to bring the entire OPA into a simultaneously-phased state.

In a fourth aspect of this disclosure, calibration techniques for the elements of OPAs are provided, where the calibration techniques can (among other things) be used to effectively calibrate numerous elements of the OPAs, such as up to one or multiple millions of elements or more. Current calibration techniques often rely on a pair-wise analysis of array elements or are otherwise unsuitable for use with OPAs having large numbers of elements. The calibration techniques disclosed here are based on near-field or far-field interferometry, which enables concurrent calibration of multiple array elements (such as those array elements within each of multiple supercells). The calibration may include the generation of phase curves (which may be implemented using lookup tables in some cases) used for control, as well as the mapping of emitter amplitudes of the array elements (which identify the transmission amplitudes of the array elements). Note, however, that any other suitable calibration data may be generated here.

In some embodiments, phase calibration of an OPA occurs in two stages. In a first stage, wavelength calibration occurs based on aligning the first-order resonances of thermal resonators used as phase modulators in the array elements. This provides rapid coarse phase alignment of the second-order resonances of the thermal resonators, which are utilized for phase control. This may be desirable since the second-order resonances have a larger bandwidth (such as 160 GHz full width at half maximum), which may be useful for communication or other signals. In a second stage, heterodyne coherent mixing in the near-field is used to generate phase curves for array antennas in parallel, which enables simultaneous phase calibration of multiple array elements (such as one or multiple thousands of array antennas) in parallel. As a particular example, for a 1024×1024 OPA, this approach may be used to calibrate 64×64 groups of array elements concurrently (although this is merely one example). This type of multi-stage approach is useful when thermal resonators are used as phase modulators since the amplitude of an array element's output can change when phase modulation is occurring using a thermal resonator in the array element. Of course, if other types of phase modulators are used (such as PN junctions), there may be no need for the first stage to occur.

In this way, in-quadrature coherent heterodyne measurements can be used to enable the unambiguous generation of phase control curves and emitter amplitude maps that are used to calibrate an OPA. Also, these calibration techniques can be used to identify defective array elements that are not operating within design parameters, which allows those defective array elements to be deactivated or not driven during subsequent use of the OPA. Further, some embodiments of these calibration techniques allow for the use of both "bright" and "dark" near-field configurations, such as when a dark field with an image-relayed mask is used for heterodyne mixing to reduce the measurement noise floor and provide a higher-composite beam quality (which is better absolute phase calibration). In addition, in some instances, a concurrent far-field measurement may be used to validate the composite system performance (such as beam quality), one example of which may involve using "power in the bucket" measurements to measure power in a receive aperture.

Note that these four aspects broadly describe various concepts disclosed in this patent document. Additional details regarding these concepts are provided below. It should be noted here that while these concepts are described as being used in a common system, nothing requires all of these concepts to be used together in the same implementation. Thus, for example, a device or system may implement one, some, or all of these concepts.

FIG. 1 illustrates an example system 100 supporting photonic integrated circuit-based communication according to this disclosure. As shown in FIG. 1, the system 100 includes two nodes 102 and 104 that communicate with one another optically. Each node 102 and 104 represents a ground-, air-, or space-based system that can transmit and/or receive data using optical communications. In this example, the nodes 102 and 104 can engage in bidirectional communication with one another. However, this is not necessarily required, and the nodes 102 and 104 may engage in unidirectional communication with one another (meaning one node 102 or 104 may only transmit and the other node 104 or 102 may only receive, at least with respect to each other).

The node 102 in this example includes an optical transmitter 106, which generally operates to produce optical signals 108 used for communication or other purposes. For example, the optical transmitter 106 may encode information onto the optical signals 108, such as by using suitable amplitude, phase, frequency, and/or other modulation(s) of light. The optical signals 108 can be transmitted through free space or other transmission medium to the node 104, where an optical receiver 110 receives and processes the optical signals 108. For instance, the optical receiver 110 can identify the amplitude, phase, frequency, and/or other modulation(s) of light in the optical signals 108 and use the identified modulation(s) to recover the information encoded onto the optical signals 108. Any suitable type of modulation/demodulation scheme may be used here to encode and decode the optical signals 108 (assuming communication is one purpose of the optical signals 108). Since the nodes 102 and 104 are bidirectional in this example, the same process can be used in the opposite direction, meaning an optical transmitter 112 of the node 104 produces optical signals 114 that are transmitted towards the node 102 and received and processed by an optical receiver 116 of the node 102.

Note that while the optical transmitter 106 and the optical receiver 116 are shown here as separate components, they can be integrated into a single optical transceiver 118. This may allow, for example, the same PIC-based structure to be used for both transmission and reception purposes. Similarly, while the optical transmitter 112 and the optical receiver 110 are shown here as separate components, they can be integrated into a single optical transceiver 120. This may allow, for instance, the same PIC-based structure to be used for both transmission and reception purposes. As described in more detail below, each of the optical transmitters 106 and 112, optical receivers 110 and 116, or optical transceivers 118 and 120 includes at least one PIC-based optical phased array, which is used to transmit and/or receive the optical signals 108 and 114.

The optical transmitters, receivers, and transceivers described in this disclosure may find use in a large number of applications. For example, optical transmitters, receivers, or transceivers may be used in data centers or telecommunication systems to transport information rapidly between locations, including the transport of large amounts of information over very large distances. Optical transmitters, receivers, or transceivers may be used in consumer or commercial electronic devices, biomedical devices, or advanced computing devices to support optical-based communications with those devices. Optical transmitters, receivers, or transceivers may be used in airplanes, drones, satellites, autonomous vehicles, rockets, missiles, or other commercial or defense-related systems. In general, this disclosure is not limited to any particular application of the optical transmitters, receivers, and transceivers.

Although FIG. 1 illustrates one example of a system 100 supporting photonic integrated circuit-based communication, various changes may be made to FIG. 1. For example, while only two nodes 102 and 104 are shown here, the system 100 may include any suitable number of nodes that engage in any suitable unidirectional, bidirectional, or other communications with each other. Also, each node of the system 100 may include any suitable number of optical transmitters, receivers, or transceivers that communicate via any number of optical signals. In addition, the system 100 is shown in simplified form here and may include any number of additional components in any suitable configuration as needed or desired.

Figure 2:
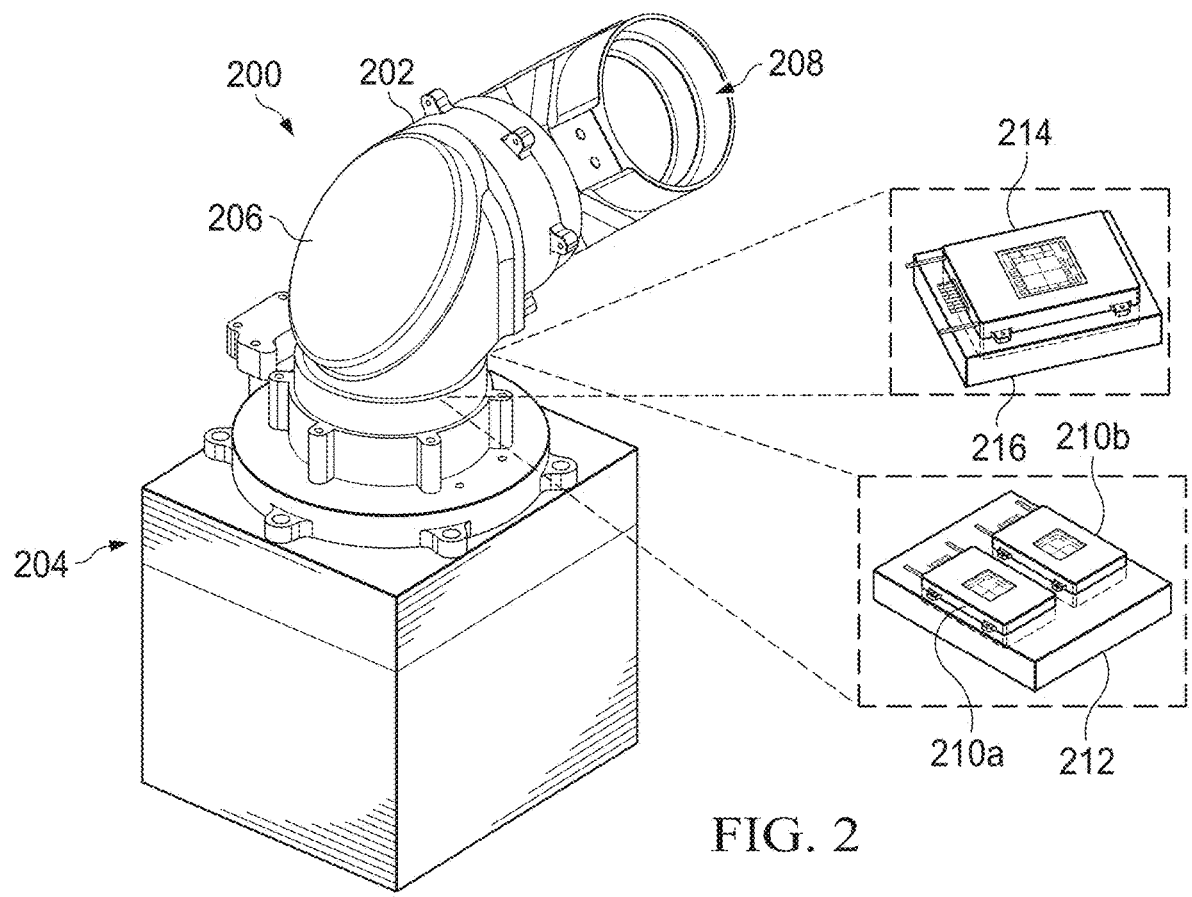
FIG. 2 illustrates an example apparatus supporting photonic integrated circuit-based communication according to this disclosure.

FIG. 2 illustrates an example apparatus 200 supporting photonic integrated circuit-based communication according to this disclosure. For ease of explanation, the apparatus 200 may be described as representing or being used as part of one or more nodes 102 and 104 in the system 100 of FIG. 1. However, the apparatus 200 may be used as, in, or with any other suitable device or system.

As shown in FIG. 2, the apparatus 200 includes a housing 202, which can be used to encase and protect other components supporting PIC-based communication. The housing 202 may be formed from any suitable material(s), such as one or more metals, and in any suitable manner. The housing 202 may also have any suitable size, shape, and dimensions. In this example, the housing 202 can be secured to a support structure 204, which represents any suitable structure on or to which the housing 202 can be secured. A cover 206 may be removably connected to the housing 202 in order to selectively provide access to an interior space of the housing 202. The housing 202 also defines at least one aperture 208 through which outgoing or incoming optical signals, such as the signals 108 and 114, may pass. In this particular example, there is a single aperture, although the housing 202 may define multiple apertures (such as one aperture for transmission and one aperture for reception).

At least one optical transmitter, optical receiver, and/or optical transceiver is positioned within the housing 202 and communicates via the at least one aperture 208. For example, in some cases, the apparatus 200 may include at least one optical transmitter 210a (which may represent at least one instance of the optical transmitter 106 or 112) and at least one optical receiver 210b (which may represent at least one instance of the optical receiver 110 or 116). In this example, the optical transmitter 210a and the optical receiver 210b are positioned side-by-side on a common support 212, which may allow the optical transmitter 210a and the optical receiver 210b to communicate via a single aperture 208 (although this is not necessarily required). In other cases, the apparatus 200 may include at least one optical transceiver 214 (which may represent at least one instance of the optical transceiver 118 or 120) on a support 216, where the optical transceiver 214 can communicate via the aperture 208. For instance, the optical transceiver 214 may support optical transmissions at one or more wavelengths and optical receptions at one or more different wavelengths. Any suitable combination of at least two optical transmitter(s), optical receiver(s), and/or optical transceiver(s) may be used in the apparatus 200.

Although FIG. 2 illustrates one example of an apparatus 200 supporting photonic integrated circuit-based communication, various changes may be made to FIG. 2. For example, the apparatus 200 may include any suitable number of optical transmitters, optical receivers, and/or optical transceivers that support communications with one or more external components. Also, the use of one optical transmitter and one optical receiver side-by-side and the use of one optical transceiver represent two example ways in which optical transmitters, optical receivers, and/or optical transceivers can be used, but these components may be used in any other suitable manner. Further, PIC-based communications may be used in or by a wide range of devices and are not limited to the specific apparatus shown here. For instance, the housing 202 may instead be formed as a rotatable gimbal that can redirect one or more optical transmitters, optical receivers, or optical transceivers as needed or desired. In addition, any other suitable components may be used with the apparatus 200 to support any other desired functions of the apparatus 200. As an example, the apparatus 200 may include components that support the generation and transmission and/or the reception and processing of beacon signals, which may be used to help identify where the apparatus 200 should be aimed to engage in optical communications, or other signals.

Figure 3:
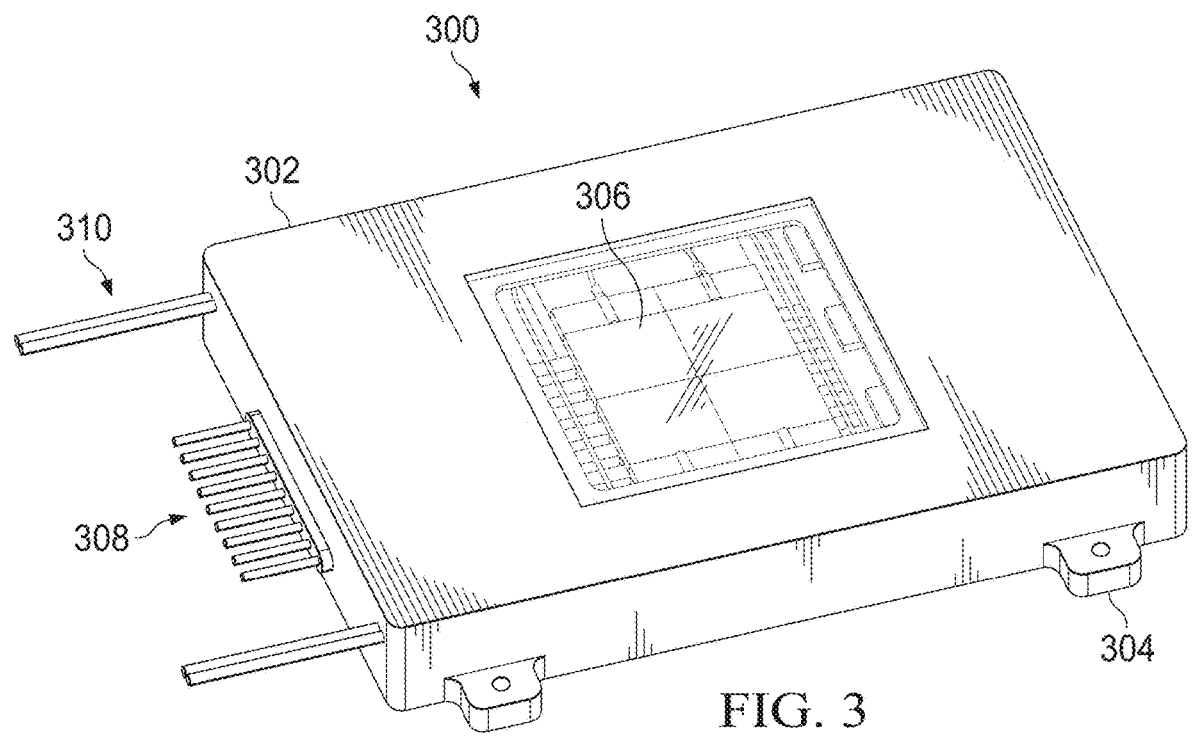
FIGS. 3 through 5 illustrate an example photonic integrated circuit-based optical device according to this disclosure.
Figure 4:
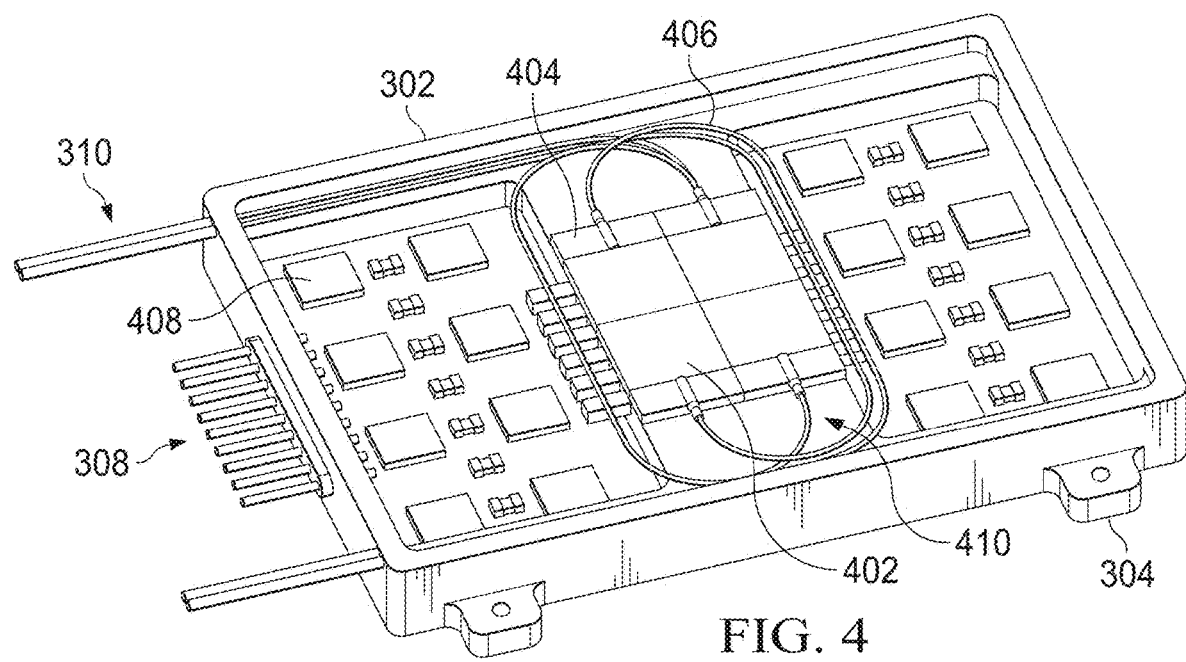
Figure 5:
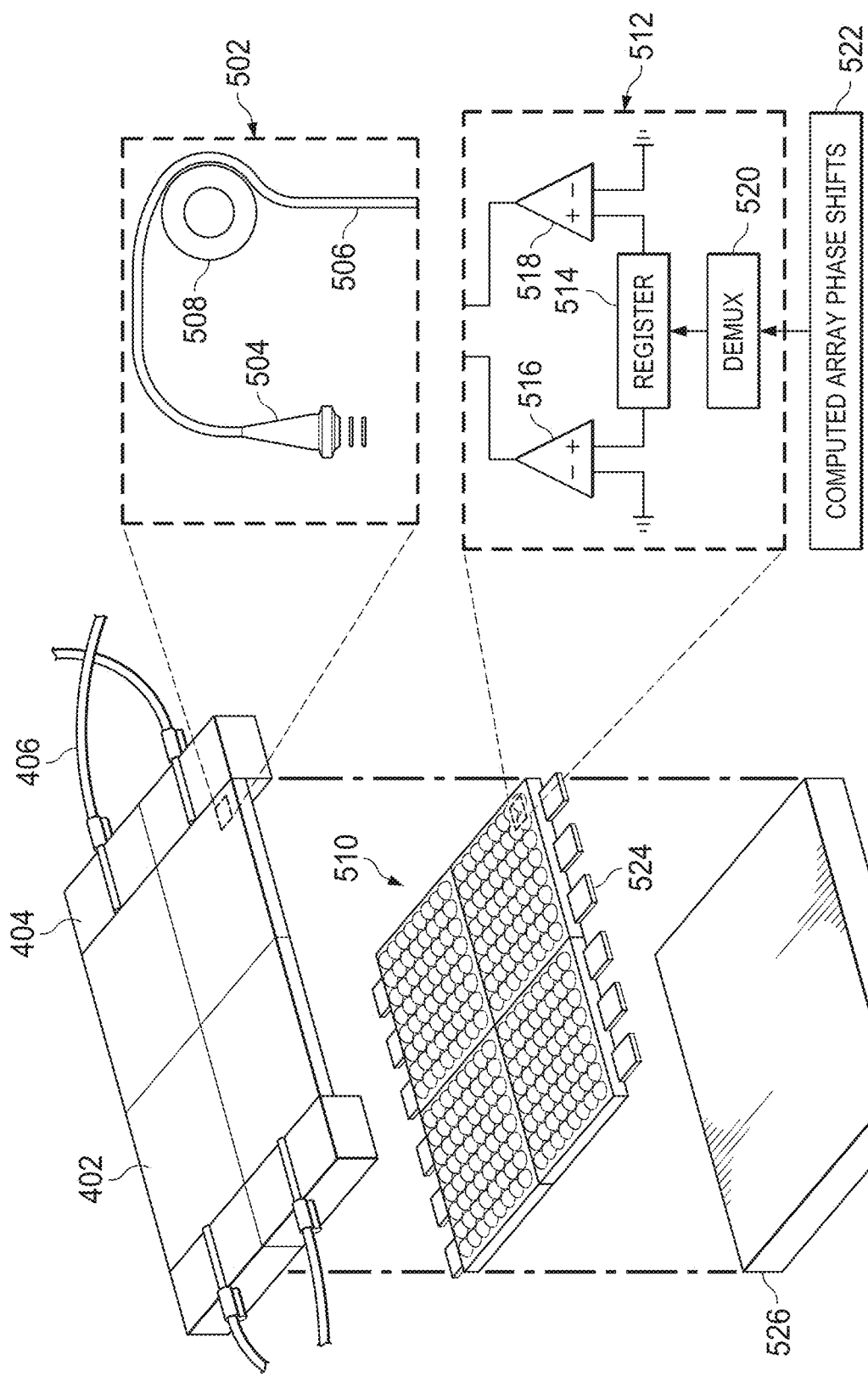

FIGS. 3 through 5 illustrate an example photonic integrated circuit-based optical device 300 according to this disclosure. For ease of explanation, the optical device 300 is described as being used to implement one of the optical transmitter 210a, optical receiver 210b, or optical transceiver 214 of FIG. 2, which may be used in the system 100 of FIG. 1. However, the optical device 300 may be used in any other suitable apparatus and in any other suitable system.

As shown in FIG. 3, the optical device 300 includes a package 302, which surrounds and protects electronic and optical components of an optical transmitter 210a, optical receiver 210b, or optical transceiver 214. For example, the package 302 may encase and form a hermetic seal around the electronic and optical components. The package 302 may be formed from any suitable material(s), such as one or more metals, and in any suitable manner. In some embodiments, the package 302 is formed using a nickel-cobalt or nickel-iron alloy (such as KOVAR) or other material that has a coefficient of thermal expansion closely matched to that of borosilicate or other glass. The package 302 may also have any suitable size, shape, and dimensions. In some cases, the package 302 may be formed in multiple parts that can be bonded, sealed, or otherwise coupled together to enclose the electronic and optical components. For example, the package 302 may be formed using a larger lower portion and an upper cover such that the electronic and optical components can be inserted into the lower portion and the upper cover can be connected to the lower portion. Also, in some cases, the package 302 may include flanges 304 that support mounting of the package 302 to a larger structure. However, the package 302 may have any other suitable form.

The package 302 includes an optical window 306, which is substantially or completely transparent optically (at least with respect to the optical signals being transmitted from or received by the optical device 300). The optical window 306 may be formed from any suitable material(s), such as borosilicate glass or other glass, and in any suitable manner. The optical window 306 may also have any suitable size, shape, and dimensions. In some cases, the optical window 306 may also function as a bandpass or other optical filter that filters the wavelength(s) of the optical signals being transmitted from or received by the optical device 300.

The package 302 may also include one or more electrical feedthroughs 308, which represent one or more electrical connections that can be used to transport one or more electrical signals between the interior and the exterior of the package 302. The one or more electrical signals may be used here for any suitable purposes, such as to control one or more operations of the optical device 300. As a particular example, the one or more electrical signals may be used for controlling the phases of antenna elements of a photonic integrated circuit in the optical device 300. In addition, the package 302 may include one or more fiber inputs/outputs 310, which can be used to provide one or more input signals to the optical device 300 and/or receive one or more output signals from the optical device 300. The one or more input signals may carry information to be transmitted from the optical device 300. The one or more output signals may carry information received at and recovered by the optical device 300. In this example, there are two fiber inputs/outputs 310, although the optical device 300 may include a single fiber input/output 310 or more than two fiber inputs/outputs 310. Note, however, that no fiber inputs/outputs 310 may be needed if all optical generation and processing occurs using components within the package 302, in which case the electrical feedthroughs 308 may be used to transport information to or from the optical device 300.

As shown in FIG. 4, a photonic integrated circuit 402 is positioned within the package 302, namely at a location where the photonic integrated circuit 402 can transmit and/or receive optical signals through the optical window 306. As described below, the photonic integrated circuit 402 can be used to support optical transmission and/or optical reception, depending on the design of the photonic integrated circuit 402. The photonic integrated circuit 402 may also support a number of additional optical functions as needed or desired. The photonic integrated circuit 402 may be formed from any suitable material(s), such as silicon, indium phosphide, or gallium arsenide, and in any suitable manner. The photonic integrated circuit 402 may also have any suitable size, shape, and dimensions. As a particular example, the photonic integrated circuit 402 may be square and have an edge length of about 40 mm, although any other suitable sizes and shapes may be used here.

Fiber mounts 404 are used to couple to optical fibers 406 at locations where the optical fibers 406 can provide optical signals to and/or receive optical signals from the photonic integrated circuit 402. For example, the optical fibers 406 may provide optical signals from a source laser to the photonic integrated circuit 402 for use during outgoing transmissions. The optical fibers 406 may also or alternatively provide optical signals received by the photonic integrated circuit 402 to a receiver for processing. Each fiber mount 404 includes any suitable structure configured to be coupled to an optical fiber 406. Each optical fiber 406 represents any suitable length of an optical medium configured to transport optical signals to or from a photonic integrated circuit 402. Note that while four fiber mounts 404 and optical fibers 406 are shown here, the optical device 300 may include, one, two, three, or more than four fiber mounts 404 and optical fibers 406. Also note that no fiber mounts 404 and optical fibers 406 may be needed if all optical generation and processing occurs using components of the photonic integrated circuit 402.

An electronic control board 408 includes electronic components, such as one or more integrated circuit chips and other components, that control the operation of the photonic integrated circuit 402. For example, the electronic control board 408 may include one or more components that calculate desired phases for optical signals to be generated by antenna elements of the photonic integrated circuit 402, which allows the electronic control board 408 to control beam forming or beam steering operations. Also or alternatively, the electronic control board 408 may include one or more components that calculate desired phases to be applied to optical signals received by antenna elements of the photonic integrated circuit 402, which allows the electronic control board 408 to control wavefront reconstruction operations. The electronic control board 408 includes any suitable components configured to perform one or more desired functions related to a photonic integrated circuit 402. Spacers 410 may be positioned on opposite sides of the photonic integrated circuit 402 and used to help separate the optical fibers 406 from the electronic control board 408. The spacers 410 may be formed from any suitable material(s), such as ceramic, and in any suitable manner.

As shown in FIG. 5, the photonic integrated circuit 402 itself includes a number of array elements 502, which represent PIC unit cells of the photonic integrated circuit 402. Each array element 502 is configured to transmit or receive one or more optical signals. The photonic integrated circuit 402 can include any suitable number of array elements 502, possibly up to and including a very large number of array elements 502. In some embodiments, for example, the photonic integrated circuit 402 may include an array of elements 502 up to a size of 1024×1024 (meaning over one million array elements 502) or even larger. The size of the photonic integrated circuit 402 is based, at least in part, on the number and size of the array elements 502. As noted above, in some cases, the photonic integrated circuit 402 may be square with edges of about 40 mm in length. However, the photonic integrated circuit 402 may be scaled to smaller or larger sizes (such as about 2.5 cm by about 2.5 cm), while further scaling up to even larger sizes (such as about 20 cm by about 20 cm or about 30 cm by about 30 cm) may be possible depending on fabrication capabilities.

Each array element 502 includes an antenna element 504, which is configured to physically transmit or receive one or more optical signals to or from one or more external devices or systems. For example, each antenna element 504 may represent a nanophotonic antenna or other antenna element that transmits or receives at least one optical signal, along with one or more lenses or other optical devices configured to focus or otherwise process the at least one optical signal. Depending on the implementation, the antenna element 504 may sometimes be referred to as an emitter in a transmitting array or a receiver in a receiving array. Each antenna element 504 may have any suitable size, shape, and dimensions. In some cases, the emitting/receiving surface of the antenna element 504 may be about 3 µm to about 4 µm in diameter.

Each antenna element 504 here is coupled to a signal pathway 506. The signal pathways 506 are configured to transport optical signals to and/or from the antenna elements 504. For example, the signal pathways 506 can provide optical signals to the antenna elements 504 for transmission. Also or alternatively, the signal pathways 506 can provide optical signals received by the antenna elements 504 to optical detectors or other components for processing. Each signal pathway 506 includes any suitable structure configured to transport optical signals, such as an optical waveguide. Note that only a portion of the signal pathway 506 may be shown in FIG. 5, since a signal pathway 506 can vary based on how the associated array element 502 is designed and positioned within the photonic integrated circuit 402.

A modulator 508 is provided for each antenna element 504 and is used (among other things) to control the phases of optical signals transmitted or received by the associated antenna element 504. For example, when the antenna elements 504 are transmitting, the modulators 508 can be used to achieve desired phases of outgoing optical signals in order to perform beam forming or beam steering. When the antenna elements 504 are receiving, the modulators 508 can be used to apply phase control to the incoming wavefront of received optical signals in order to decompose or reconstruct the wavefront. Each modulator 508 includes any suitable structure configured to modulate the phase of an optical signal, such as a resonant micro-ring modulator or a PN junction micro-ring modulator. In some cases, each modulator 508 may be a resonant micro-ring modulator that is about 5.5 µm in diameter, although modulators of other sizes may be used here.

The modulators 508 of the photonic integrated circuit 402 are electrically coupled to a digital read in integrated circuit (DRIIC) layer 510, which is used to provide electrical signals to the modulators 508 in order to control the phase modulations applied to the incoming or outgoing optical signals by the modulators 508. In some embodiments, the photonic integrated circuit 402 can be "flip-chip" bonded to the DRIIC layer 510, although other mechanisms for electrically coupling the photonic integrated circuit 402 and the DRIIC layer 510 may be used.

The DRIIC layer 510 in this example includes a number of individual DRIIC cells 512, where each DRIIC cell 512 may be associated with (and in some cases may have about the same size as) a corresponding one of the array elements 502. The DRIIC cells 512 control the phase modulations that are applied by the modulators 508 of the array elements 502. The DRIIC cells 512 may essentially function as digital-to-analog conversion devices, where digital programming (such as 2-bit, 8-bit, or other digital values) are converted into appropriately-scaled direct current (DC) analog voltages spanning a specific range of voltages. As a particular example, the DRIIC cells 512 may operate to convert digital values into suitable DC analog voltages between 0 V and 3.3 V, although other voltages (including negative voltages) can be supported depending on the implementation.

In this example, each DRIIC cell 512 may include a register 514 configured to store values associated with different phase shifts to be applied by the modulator 508 of its corresponding array element 502. To provide a desired phase shift, appropriate values from the register 514 are selected and provided to two amplifiers 516 and 518, which generate output voltages that are provided to the associated modulator 508. The output voltages control the phase shift provided by the associated modulator 508. Different values from the register 514 are provided to the amplifiers 516 and 518 over time so that different output voltages are applied to the associated modulator 508. In this way, each DRIIC cell 512 can cause its associated modulator 508 to provide different phase shifts over time, thereby supporting various functions like beam forming, beam steering, or wavefront reconstruction.

In some embodiments, each DRIIC cell 512 may be used to provide a relatively small number of different output voltages to its associated modulator 508. For example, in some cases, each DRIIC cell 512 can cause the associated modulator 508 to provide four different phase shifts. However, other numbers of output voltages and associated phase shifts may be supported here, such as when up to 256 different phase shifts or more are supported. Also, the output voltages provided to the modulators 508 in different DRIIC cells 512 may be different even when those modulators 508 are providing the same phase shift, which may be due to factors such as manufacturing tolerances. The actual output voltages used for each modulator 508 can be selected during calibration so that appropriate values may be stored in each register 514.

In this example, the actual values in each DRIIC cell 512 that are provided to the amplifiers 516 and 518 by the register 514 over time can be controlled using a demultiplexer 520. Each demultiplexer 520 receives a stream of computed array phase shifts 522 and outputs the phase shifts 522 that are to be applied by that DRIIC cell's associated modulator 508. The phase shifts 522 output by the demultiplexer 520 can identify or otherwise to be used to select specific values from the register 514 to be output to the amplifiers 516 and 518. The computed array phase shifts 522 here may be provided by one or more external components, such as the electronic control board 408 or an external component communicating with the electronic control board 408. While not shown here, array-level deserialization circuitry may be used to separate and fan out high-speed digital signals to the array of individual DRIIC cells 512.

Each register 514 includes any suitable structure configured to store and retrieve values. Each amplifier 516 and 518 includes any suitable structure configured to generate a control voltage or other control signal based on an input. Each demultiplexer 520 includes any suitable structure configured to select and output values.

Note that this represents one example way in which the modulators 508 of the array elements 502 can be controlled. In general, any suitable technique may be used to provide suitable control voltages or other control signals to the modulators 508 for use in controlling the phase shifts provided by the modulators 508. For example, the approach shown in FIG. 5 allows values that are applied to the amplifiers 516 and 518 to be stored in the register 514 and retrieved as needed, which allows an external component to provide indicators of the desired values to be retrieved to the DRIIC cells 512. In other embodiments, an external component may provide digital values that are converted by different circuitry into analog values.

Various electrical connections 524 are provided in or with the DRIIC layer 510. The electrical connections 524 may be used to provide electrical signals to the DRIIC cells 512, such as when the electrical connections 524 are used to receive high-speed digital signals containing the computed array phase shifts 522 for the DRIIC cells 512. Any suitable number and arrangement of electrical connections 524 may be used here.

A thermal spreader 526 can be positioned in thermal contact with the DRIIC layer 510. The thermal spreader 526 helps to provide a more consistent temperature across the DRIIC layer 510 and the photonic integrated circuit 402 by functioning as a heat sink that removes thermal energy from the DRIIC layer 510 and the photonic integrated circuit 402. At times, the thermal spreader 526 may also provide thermal energy to the DRIIC layer 510, which helps to heat the DRIIC layer 510 and the photonic integrated circuit 402. Thermal energy that is generated by the DRIIC layer 510 and/or injected into the photonic integrated circuit 402 may vary over time, and the thermal spreader 526 can help to maintain a substantially constant temperature of the photonic integrated circuit 402. The thermal spreader 526 may be formed from any suitable material(s), such as one or more metals like copper, and in any suitable manner. The thermal spreader 526 may also have any suitable size, shape, and dimensions.

Although FIGS. 3 through 5 illustrate one example of a photonic integrated circuit-based optical device 300, various changes may be made to FIGS. 3 through 5. For example, one or more photonic integrated circuits may be packaged in any other suitable manner, arranged relative to other components in any other suitable manner, and coupled to other components in any other suitable manner. Also, any other suitable modulation control approach and any other suitable thermal management approach may be used with one or more photonic integrated circuits.

Figure 6:
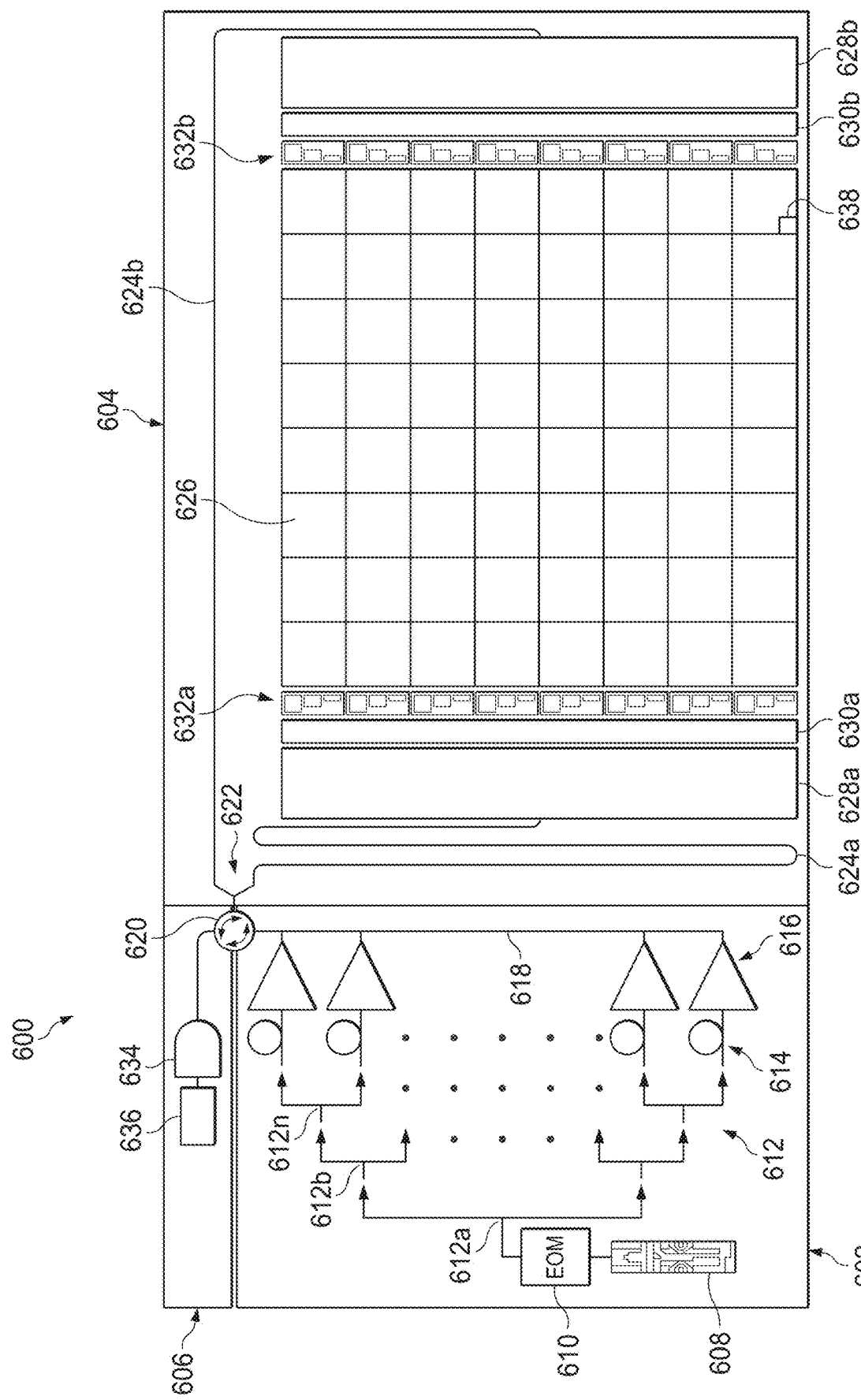
FIGS. 6 and 7 illustrate a more specific example implementation of the photonic integrated circuit-based optical device of FIGS. 3 through 5 according to this disclosure.
Figure 7:
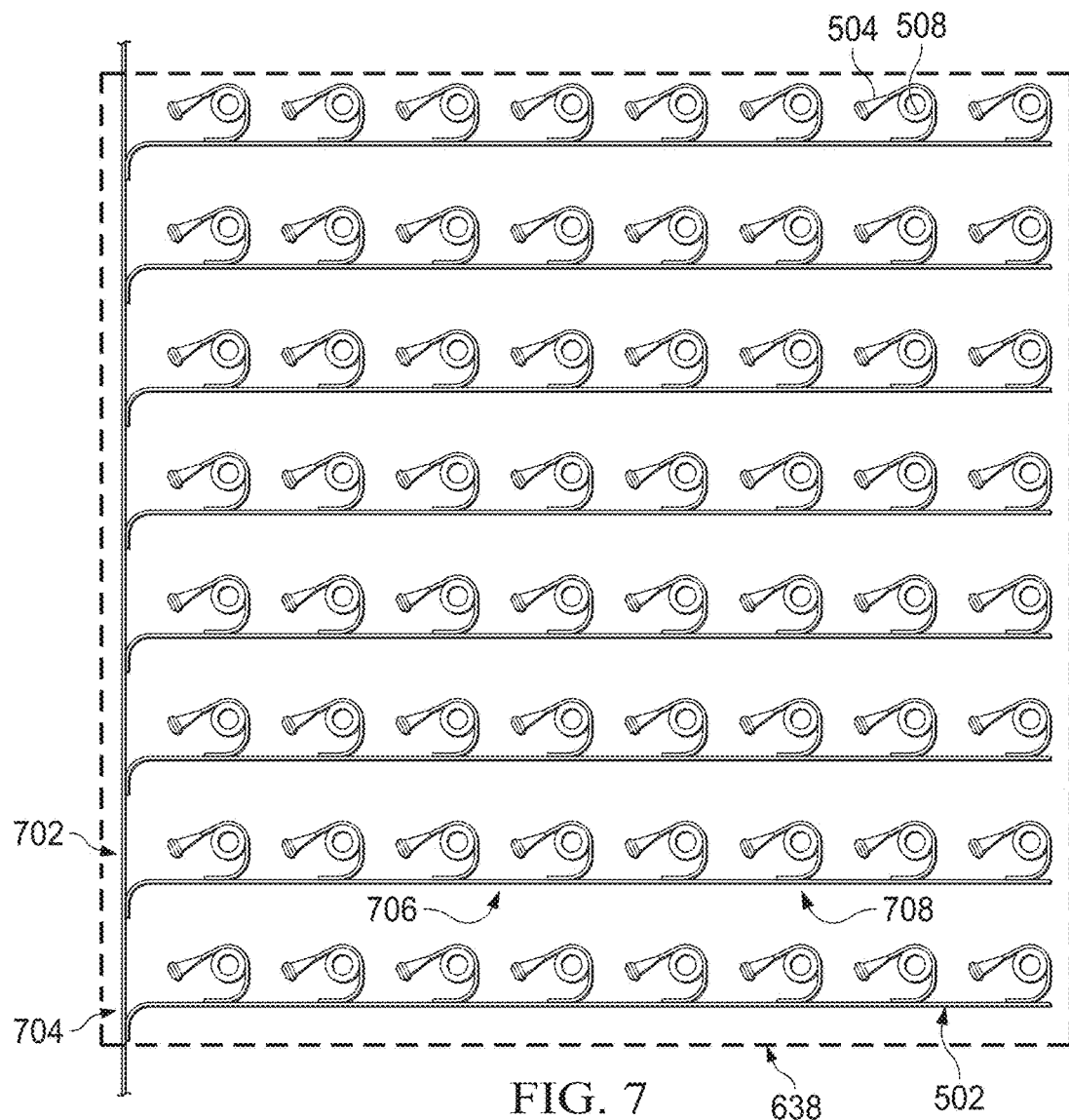

FIGS. 6 and 7 illustrate a more specific example implementation of the photonic integrated circuit-based optical device 300 of FIGS. 3 through 5 according to this disclosure. In particular, FIGS. 6 and 7 illustrate an example architecture 600 that may be implemented within the optical device 300. As shown in FIG. 6, the architecture 600 includes a source laser 602, an OPA 604, and a receiver 606. The source laser 602 generally operates to produce optical signals that are used by the OPA 604 to transmit outgoing optical signals. The OPA 604 generally operates to transmit outgoing optical signals and to receive incoming optical signals. The receiver 606 generally operates to process the incoming optical signals. These components allow the architecture 600 to support optical transceiver functionality, although some components may be removed from the architecture 600 if only optical transmitter or only optical receiver functionality is desired.

In this example, the source laser 602 includes a laser 608, which operates to produce a lower-power input beam. The laser 608 includes any suitable structure configured to generate a laser output, such as a distributed feedback (DFB) diode laser. The lower-power input beam can have any suitable power level based on the laser 602 being used for a specific application. In some cases, the lower-power input beam may have a power level of one or several tens of milliwatts to one or several hundreds of milliwatts, although these values are for illustration only. Also, in some cases, the laser 602 may be fabricated using at least one group III element and at least one group V element and may therefore be referred to as a "III-V" laser. However, any other suitable materials may be used to fabricate the laser 602. The lower-power input beam is provided to an electro-optic modulator (EOM) 610, which can modulate the lower-power input beam based on an input electrical signal. The EOM 610 can provide any suitable modulation here, such as when the EOM 610 is implemented as a Mach-Zehnder modulator (MZM) that provides amplitude modulation.

A splitter 612 generally operates to split the modulated input beam into optical signals traveling over different optical pathways. In this example, the splitter 612 includes a hierarchical arrangement of splitters 612a-612n, each of which can receive and split an optical input in order to produce two optical outputs of substantially equal power. Note that the number of splitters 612a-612n and the number of hierarchical levels of splitters 612a-612n can vary based on the number of optical signals to be produced. For example, there may be five levels of splitters if thirty-two optical signals are desired or six levels of splitters if sixty-four optical signals are desired. Note, however, that other numbers of optical signals may be produced using any suitable number of splitters. Also note that any other suitable structure(s) may be used to split an optical signal, such as a multi-mode interferometer or a coupler tree.

The optical signals from the splitter 612 can be phase shifted using an array of phase shifters 614, where each phase shifter 614 can shift the phase of one of the optical signals. Each phase shifter 614 includes any suitable structure configured to phase-shift an optical signal, such as a resonant micro-ring modulator. In some embodiments, the resonant micro-ring modulators may be silicon-based and have diameters of about 5 microns to about 6 microns, although other implementations of the phase shifters 614 may be used.

The phase-shifted optical signals are provided to an array of semiconductor optical amplifiers (SOAs) 616. Each semiconductor optical amplifier 616 amplifies one of the phase-shifted optical signals to produce a higher-power version of that optical signal. Each semiconductor optical amplifier 616 represents any suitable semiconductor-based amplifier configured to amplify an optical signal. Each of the amplified optical signals can have any suitable power level based on the semiconductor optical amplifiers 616 being used. In some cases, the amplified optical signals may each have a power level of about three watts, although this value is for illustration only. The amplified optical signals can be combined and transported over an optical waveguide 618, which allows for source-coherent combination of the outputs from the semiconductor optical amplifiers 616 (since the amplifiers 616 form a phase-locked array of SOAs). The combined signal is provided to a circulator 620, which provides the combined signal to the OPA 604.

In the OPA 604, the combined signal is split by a splitter 622 so that substantially equal first portions of the combined signal are provided to two waveguides 624a-624b. The waveguides 624a-624b here may have substantially the same length so that there is little or no phase difference between the first portions of the combined signal exiting the waveguides 624a-624b. In this example, the photonic integrated circuit 402 is implemented using supercells 626, where each supercell 626 includes a subset of the array elements 502. In some embodiments, for example, each supercell 626 may include a 32×32 arrangement of array elements 502, although other numbers and arrangements of array elements 502 may be used in each supercell 626. In this particular example, the photonic integrated circuit 402 includes sixty-four supercells 626, although other numbers of supercells 626 may be used. Multiple supercells 626 can be driven using the same portion of the combined signal from the source laser 602, which helps to simplify phase control and other operations in the architecture 600. The ability to drive all array elements 502 in a supercell 626 collectively allows, for instance, amplitude modulation of each supercell 626 to control the transmit power of the array elements 502 in that supercell 626.

In order to drive the supercells 626 using the combined signal from the source laser 602, the waveguides 624a-624b provide the first portions of the combined signal to splitters 628a-628b, such as 1×8 optical splitters, which split the first portions of the combined signal into more-numerous second portions of the combined signal. Additional splitters 630a-630b, such as 8×32 splitters, split the second portions of the combined signal into even more-numerous third portions of the combined signal. This results in the creation of sixty-four optical signals, which can be used to drive the supercells 626. Note that this arrangement of 1×8 and 8×32 splitters is merely one example of how the supercells 626 in this specific photonic integrated circuit 402 may be driven. Other approaches may be used to drive a photonic integrated circuit 402, including approaches that use other numbers or arrangements of splitters. The specific approach shown in FIG. 6 is merely one example of how supercells 626 of this specific photonic integrated circuit 402 may be driven.

Time delay paths 632a-632b are provided between the splitters 630a-630b and the supercells 626 in order to compensate for different optical path lengths to reach the different supercells 626. For example, assume that each row of supercells 626 in the photonic integrated circuit 402 is driven using four outputs from the splitter 630a and four outputs from the splitter 630b. Without compensation, different outputs from the splitters 630a-630b would reach different supercells 626 at different times, which can create undesired phase differences and reduce the throughput of the architecture 600. The time delay paths 632a-632b represent spiraled or other optical pathways that delay at least some of the outputs from the splitters 630a-630b so that the outputs from the splitters 630a-630b reach all supercells 626 at substantially the same time. For example, the time delay paths 632a-632b may delay signals to closer supercells 626 by larger amounts and delay signals to farther supercells 626 by smaller or no amounts. The optical signals that are received at the supercells 626 are used by the supercells 626 to produce outgoing optical signals.

The supercells 626 may also receive incoming optical signals, which can be transported over the waveguides 624a-624b and through the circulator 620 to the receiver 606. In this example, the receiver 606 includes at least one photodetector 634, such as at least one photodiode that converts the received incoming optical signals into electrical currents. A transimpedance amplifier 636 converts the electrical currents into electrical voltages, which can then be further processed (such as to recover information contained in the incoming optical signals).

Note that the source laser 602 and various components of the OPA 604 may be fabricated from different materials in order to allow for different optical power levels to be used in the architecture 600. For example, components of the source laser 602 may be fabricated using silicon nitride, germanium, or other materials that allow the source laser 602 to generate a relatively high-power combined beam for the OPA 604. In the OPA 604, the waveguides 624a-624b and the splitters 628a-628b may similarly be fabricated using silicon nitride or other materials that support the transport and splitting of the relatively high-power combined beam from the source laser 602. The splitters 630a-630b may be fabricated using silicon (rather than silicon nitride) or other materials that can split lower-power optical signals (since the optical energy from the source laser 602 has already been split at this point). However, the components of the architecture 600 may be fabricated from any other suitable materials. Also note that various components of the architecture 600 may or may not be fabricated using one or more common materials.

A portion 638 of one of the supercells 626 is identified in FIG. 6 and shown in greater detail in FIG. 7. As shown in FIG. 7, this portion 638 of the supercell 626 includes an 8×8 arrangement of array elements 502, where each array element 502 has a similar structure to that shown in FIG. 5. As can be seen here, the structure of the array elements 502 can be modified as needed or desired. These array elements 502 are fed using a feed path 702, where splitters 704 are positioned along the feed path 702 to split off portions of an optical signal. These portions of the optical signals are provided over feed paths 706, where splitters 708 are positioned along the feed paths 706 to further split off portions of the optical signal. Ideally, the splitters 704 and 708 are configured such that each of the array elements 502 receives a substantially equal portion of the optical signal input to the feed path 702. In some embodiments, the feed paths 702, 706 and splitters 704, 708 may be formed from silicon, although other materials may be used here.

In FIG. 7, it can be seen that different path lengths exist between the input of the feed path 702 (located at the bottom of the feed path 702 in FIG. 7) and different array elements 502. In this particular example, the shortest path length exists between the input of the feed path 702 and the bottom left array element 502, and the longest path length exists between the input of the feed path 702 and the top right array element 502. As with the supercells 626 themselves, without compensation, these different path lengths would cause different portions of an optical signal to reach the array elements 502 at different times. In some cases, the phase shifts provided by the modulators 508 in the array elements 502 can, among other things, be used to compensate for the different path lengths between the input of the feed path 702 and each array element 502. Also or alternatively, linear or other phase shifters may be used to compensate for the different path lengths between the input of the feed path 702 and each array element 502.

Note that if each supercell 626 includes a 32×32 arrangement of array elements 502, each supercell 626 would include thirty-two rows of array elements 502, where each row includes thirty-two array elements 502. Thus, the portion 638 shown in FIG. 7 would be replicated sixteen times within each supercell 626. However, it is possible for the supercells 626 to each have a different number and arrangement of array elements 502 as needed or desired.

In some embodiments, all of the components in the architecture 600 of FIG. 6 may be implemented in an integrated manner, such as when implemented using a single integrated electrical and photonic chip. As noted above, for example, different components of the architecture 600 may be fabricated using silicon and silicon nitride, which enables fabrication using standard silicon-based processes. When implemented in an integrated manner, the architecture 600 may be implemented using a single photonic integrated circuit chip, and there may be no need for components such as the fiber inputs/outputs 310, fiber mounts 404, and optical fibers 406. However, integration of the components in the architecture 600 is not necessarily required. Thus, for example, the source laser 602 may be implemented off-chip or replaced using a standard erbium-doped fiber amplifier laser or other external laser. As another example, the receiver 606 may be implemented off-chip.

Although FIGS. 6 and 7 illustrate one more specific example implementation of the photonic integrated circuit-based optical device of FIGS. 3 through 5, various changes may be made to FIGS. 6 and 7. For example, this particular embodiment logically splits the photonic integrated circuit 402 in half by using two waveguides 624a-624b, two sets of splitters 628a-628b, 630a-630b, and two sets of time delay paths 632a-632b. However, the photonic integrated circuit 402 may be logically split into other numbers of portions or not logically split. Also, various components in FIGS. 6 and 7 may be combined, further subdivided, replicated, omitted, or rearranged and additional components may be added according to particular needs.

Figure 8:
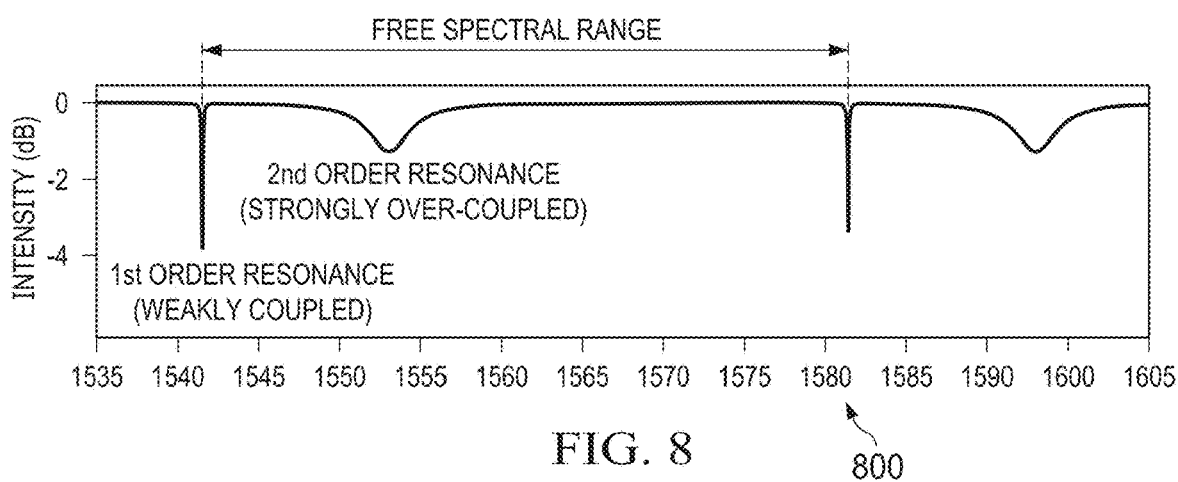
FIG. 8 illustrates an example behavior of modulators in array elements of a photonic integrated circuit according to this disclosure.

As noted above, the apparatus 200 may include multiple apertures 208 (which can be used with an optical transmitter 210a and a separate optical receiver 210b) or a shared aperture 208 (which can be used with an optical transceiver 214 or side-by-side optical transmitter 210a and optical receiver 210b). When used with a shared aperture 208, the transmit and receive wavelengths can be separated by a suitable amount in order to allow concurrent transmission and reception of optical signals. For example, the transmit and receive wavelengths can be separated by the free spectral range of the modulators 508 used in the photonic integrated circuit 402. FIG. 8 illustrates an example behavior of modulators 508 in array elements 502 of a photonic integrated circuit 402 according to this disclosure. More specifically, FIG. 8 shows an example graph 800 plotting how an intensity of a modulator 508 varies by wavelength. This example assumes that the modulators 508 are fabricated in silicon and have a diameter of about 5.5 µm. Given these parameters, a 40 nm separation between the transmit and receive wavelengths is adequate. This wavelength separation helps to reduce or minimize transmit backscatter into the receiver's detector.

Note that the free spectral range of the modulators 508 (and therefore the separation between the transmit and receive wavelengths) can vary based on a number of factors, such as the spacing or diameter of the modulators 508 or the index of refraction of the material forming the modulators 508. Also note that wavelength separation can be supported in other ways, such as by using on-chip Bragg gratings.

Although FIG. 8 illustrates one example of behavior of modulators 508 in array elements 502 of a photonic integrated circuit 402, various changes may be made to FIG. 8. For example, the specific behavior shown in FIG. 8 relates to one specific implementation of the modulators 508 and can vary for other implementations.

Note that the ability to change the phases of optical signals using the modulators 508 in the array elements 502 of the photonic integrated circuit 402 may support other functions in addition to beam forming, beam steering, or wavefront reconstruction operations. For example, atmospheric phase distortions are known to affect optical transmissions. Various mechanisms are known for measuring atmospheric phase distortions, and these measured phase distortions may be used to adjust the phases provided by the modulators 508. For instance, the phase shifts provided by the modulators 508 may be adjusted to provide corrections to the measured atmospheric phase distortions. Other types of adaptive corrections may also be made by adjusting the phases of the modulators 508, such as tip/tilt correction. Effectively, the modulators 508 in the photonic integrated circuit 402 can be used to provide an adaptive optic function.

Figure 9:
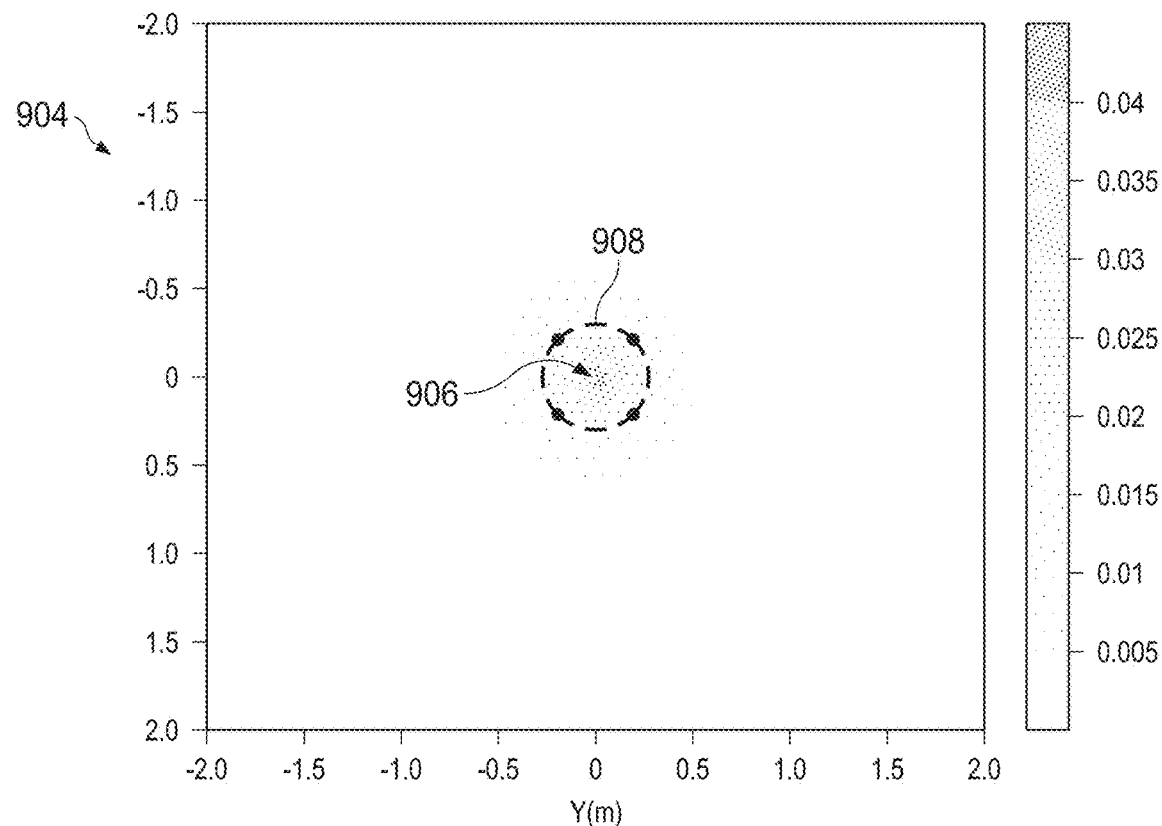
FIG. 9 illustrates an example effect of implementing an adaptive optic function in a photonic integrated circuit according to this disclosure.
Figure 9:
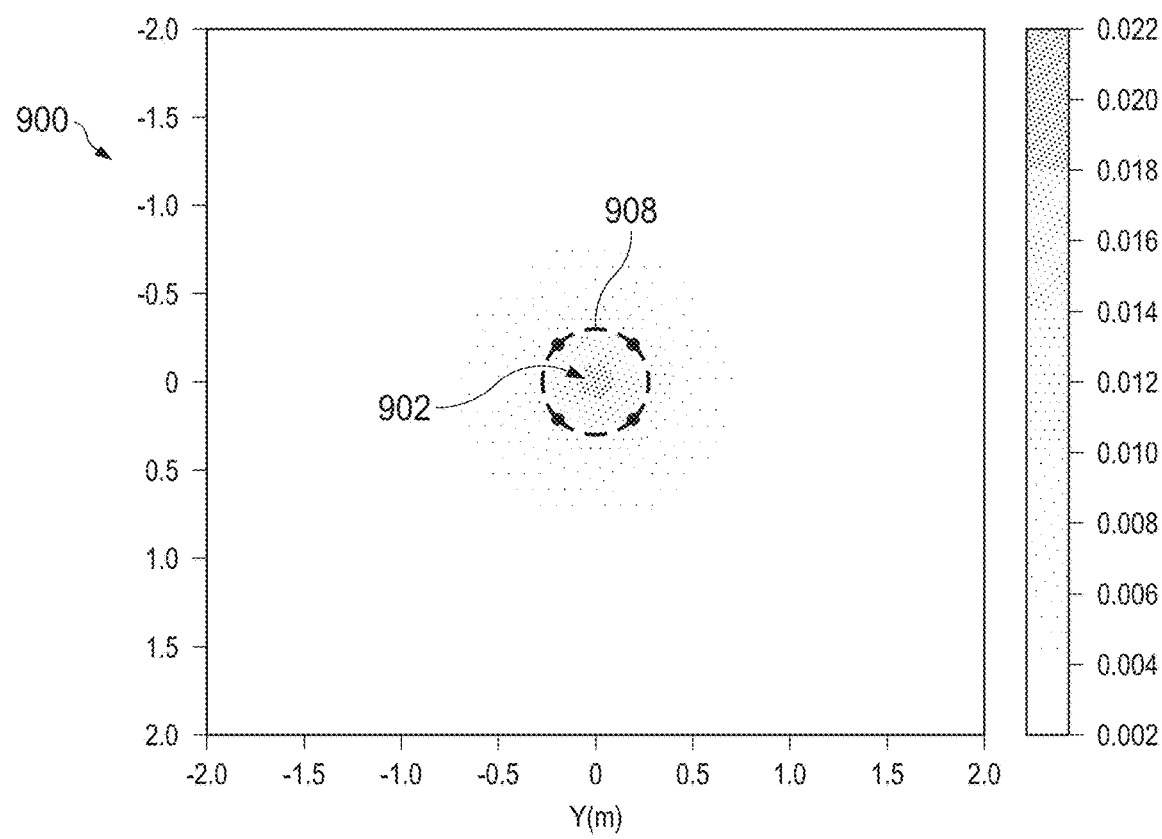

FIG. 9 illustrates an example effect of implementing an adaptive optic function in a photonic integrated circuit 402 according to this disclosure. As shown in FIG. 9, an image 900 illustrates a beam 902 transmitted without an adaptive optic function, and an image 904 illustrates a beam 906 transmitted with an adaptive optic function implemented within a photonic integrated circuit 402. A circle 908 in each image represents an ideal or preferred beam diameter. As can be seen here, adaptive optic compensation can significantly improve the beam diameter, which can translate into a much higher data rate for optical communications.

Although FIG. 9 illustrates one example effect of implementing an adaptive optic function in a photonic integrated circuit 402, various changes may be made to FIG. 9. For example, the beams 902 and 906 shown here are examples only and are merely meant to illustrate one possible effect of performing adaptive optic compensation using a photonic integrated circuit.

As described above, the modulators 508 may be implemented in various ways. In some embodiments, optical phase shifts occur in each of the array elements 502 by (i) changing the index of refraction of a waveguide carrying an optical signal or (ii) changing the charge carrier density of a waveguide carrying an optical signal. The first approach may be achieved using thermal resonators, and the second approach may be achieved using PN junction micro-ring modulators. One possible advantage of PN junction micro-ring modulators over thermal resonators is power consumption, since PN junction micro-ring modulators may consume very small amounts of power (such as less than 10 µW each).

Figure 10:
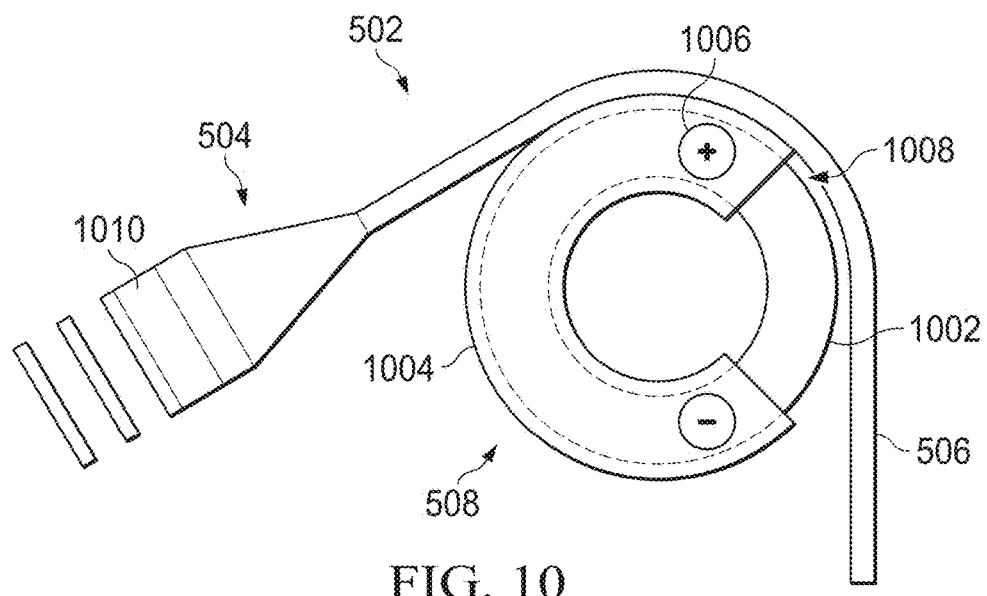
FIGS. 10 and 11 illustrate example modulators in array elements of a photonic integrated circuit according to this disclosure.
Figure 11:
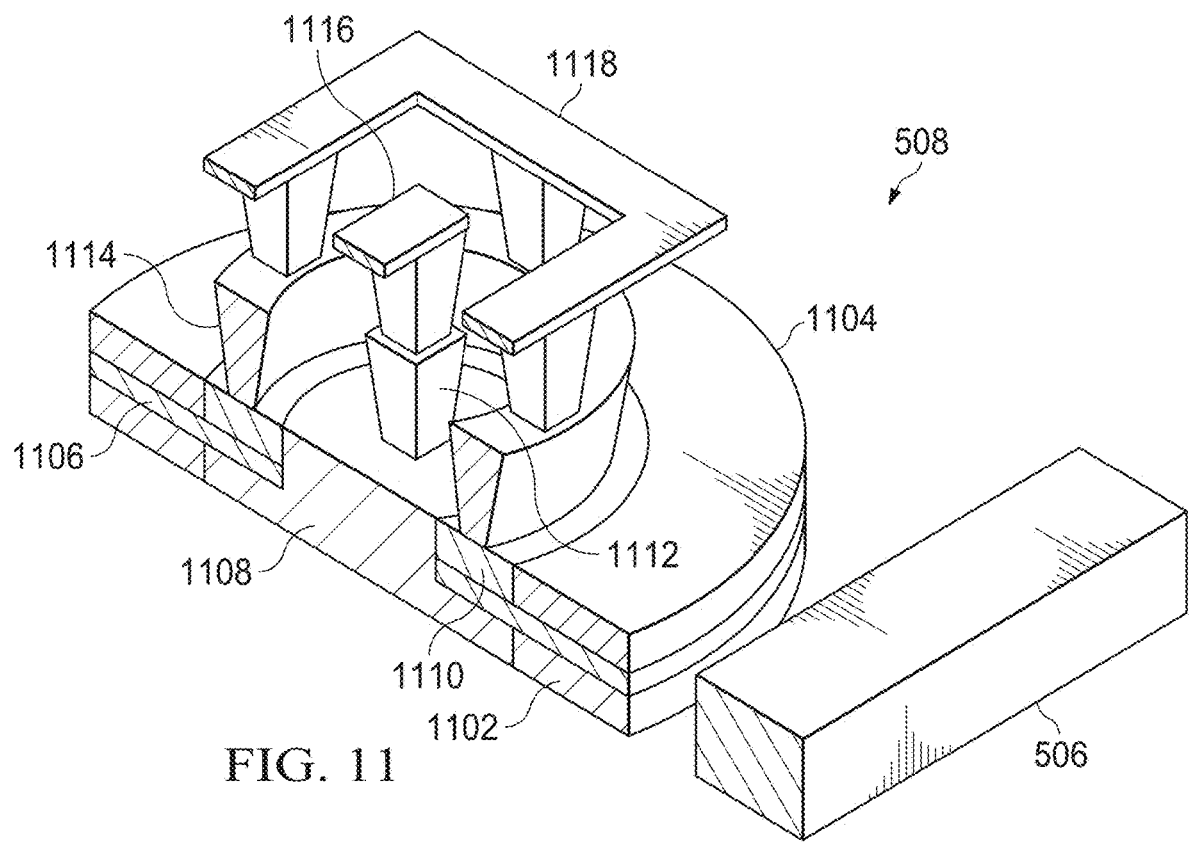

FIGS. 10 and 11 illustrate example modulators 508 in array elements 502 of a photonic integrated circuit 402 according to this disclosure. As shown in FIG. 10, the modulator 508 here represents a thermal resonator that is implemented using a micro-ring resonator 1002 and a heater 1004 positioned above or otherwise near the micro-ring resonator 1002. The micro-ring resonator 1002 resonates based on an optical signal flowing through the associated signal pathway 506. Varying the temperature of the micro-ring resonator 1002 alters the resonance wavelength of the micro-ring resonator 1002, thereby changing the phase of the optical signal flowing through the signal pathway 506. Voltages can be applied to two electrical contacts 1006 of the heater 1004 in order to create the desired temperature change and therefore implement the desired phase shift of the optical signal flowing through the signal pathway 506. The voltages applied to the electrical contacts 1006 of the heater 1004 can represent the output voltages from the amplifiers 516 and 518. As noted above, different voltages applied to the heater 1004 by the corresponding DRIIC cell 512 can cause different phase shifts to occur in the modulator 508.

The micro-ring resonator 1002 may be formed from any suitable material(s), such as silicon, and in any suitable manner. The heater 1004 may be formed from any suitable material(s), such as one or more metals, and in any suitable manner. The micro-ring resonator 1002 may be separated from the heater 1004 by any suitable material(s), such as silicon dioxide. The micro-ring resonator 1002 and heater 1004 may each have any suitable size, shape, and dimensions. In some embodiments, the micro-ring resonator 1002 is annular and has a diameter of about 5.5 µm, and the heater 1004 is crescent-shaped and has a diameter of about 5.5 µm. However, other shapes and sizes may be used here. The electrical contacts 1006 of the heater 1004 here can be coupled to the outputs of the corresponding DRIIC cell 512 in any suitable manner, such as via flip-chip bonding. A gap 1008 between the micro-ring resonator 1002 and the signal pathway 506 may have any suitable value, such as about 150 nm to about 210 nm (±10 nm).

One portion 1010 of the antenna element 504 is identified in FIG. 10. This portion 1010 of the antenna element 504 may represent a partially-etched portion of the material(s) forming the antenna element 504. For example, this portion 1010 of the antenna element 504 may be etched about one-half of the way through the total height of the antenna element 504. If, for instance, the material forming the antenna element 504 is about 220 nm in height, the portion 1010 of the antenna element 504 may be etched to a depth of about 110 nm. This arrangement may be present in all of the antenna elements 502, regardless of the structure of the associated modulators 508.

As shown in FIG. 11, the modulator 508 here represents a PN junction micro-ring modulator that is implemented using various regions of semiconductor material, such as doped and undoped silicon. In this example, the modulator 508 is shown in cross-section for explanation. Here, the modulator 508 includes a first annular semiconductor region 1102 separated from a second annular semiconductor region 1104. The annular semiconductor regions 1102 and 1104 can represent different types of semiconductor material, such as when the annular semiconductor region 1102 represents an N-type semiconductor material and the annular semiconductor region 1104 represents a P-type semiconductor material. A semiconductor region 1106 (such as undoped silicon) can separate the regions 1102-1104. A doped semiconductor region 1108 is positioned within the annular regions 1102-

1104, and a doped semiconductor region 1110 is positioned around an upper portion of the doped semiconductor region 1108. The doped semiconductor regions 1108 and 1110 can represent different regions of semiconductor material with different dopants, such as when the doped semiconductor region 1108 is doped with an N+ dopant and the doped semiconductor region 1110 is doped with a P+ dopant. An electrical contact 1112 can be used to form an electrical connection with the doped semiconductor region 1108, and an electrical contact 1114 can be used to form an electrical connection with the doped semiconductor region 1110. An electrical connection 1116 can be used to provide a voltage to the electrical contact 1112, and an electrical connection 1118 can be used to provide a voltage to the electrical contact 1114.

Here, the various semiconductor regions 1102-1110 form a PN junction micro-ring modulator, and the electrical contacts 1112, 1114 and electrical connections 1116, 1118 allow voltages to be applied that alter the charge carrier density of the PN junction micro-ring modulator. This alters the phase of an optical signal flowing through the associated signal pathway 506. The electrical connections 1116, 1118 here can be coupled to the outputs of the corresponding DRIIC cell 512 in any suitable manner, such as via flip-chip bonding. Voltages applied to the electrical connections 1116, 1118 can provide the desired voltage difference and therefore implement the desired phase shift of the optical signal flowing through the signal pathway 506. The voltages applied to the electrical connections 1116, 1118 can represent the output voltages from the amplifiers 516 and 518. As noted above, different voltages applied to the electrical connections 1116, 1118 by the corresponding DRIIC cell 512 can cause different phase shifts to occur in the modulator 508.

As described above, each array element 502 can be associated with a corresponding DRIIC cell 512. A photonic integrated circuit 402 with a large number of array elements 502 may therefore be associated with a large number of DRIIC cells 512. The DRIIC cells 512 are used as noted above to help perform functions such as beam forming, beam steering, or wavefront reconstruction. The thermal resonators or PN junction micro-ring modulators can be used to provide the desired phase shifts (based on the computed array phase shifts 522) in order to perform these functions. Regardless of whether thermal resonators or PN junction micro-ring modulators are used, electrical signals from the DRIIC cells 512 can be modulated at a desired rate to perform the desired function. For example, with respect to beam steering, once an optical beam is sharply formed, changes in the electrical signals from the DRIIC cells 512 to the modulators 508 can be used to steer the optical beam. Assuming that beam steering occurs at a rate of 10°/s in 0.01° steps, the electrical signals from the DRIIC cells 512 to the modulators 508 may have a refresh rate of 10×100 (or 1 kHz). If a large collection of array elements 502 is used (such as around one million array elements 502), error handling and encoding circuitry typically found in conventional focal plane arrays may be employed since, for example, a two-bit digital value per DRIIC cell 512 for one million array elements 502 changing at 1 kHz would equate to an inbound transfer rate of about 2 Gbps. Deserializing circuitry may therefore be used in the same (but opposite) way that focal planes use serialization, which allows commands for numerous array elements to be carried in a reduced number of high-speed digital channels. In some cases, the DRIIC cells 512 can be designed and fabricated using traditional (and often very simple) CMOS or other silicon-based fabrication techniques.

Although FIGS. 10 and 11 illustrate examples of modulators 508 in array elements 502 of a photonic integrated circuit 402, various changes may be made to FIGS. 10 and 11. For example, the actual structure of a thermal resonator or PN junction micro-ring modulator can vary as needed or desired. Also, any other suitable structure may be used to phase-modulate an optical signal in each array element 502.

Figure 12:
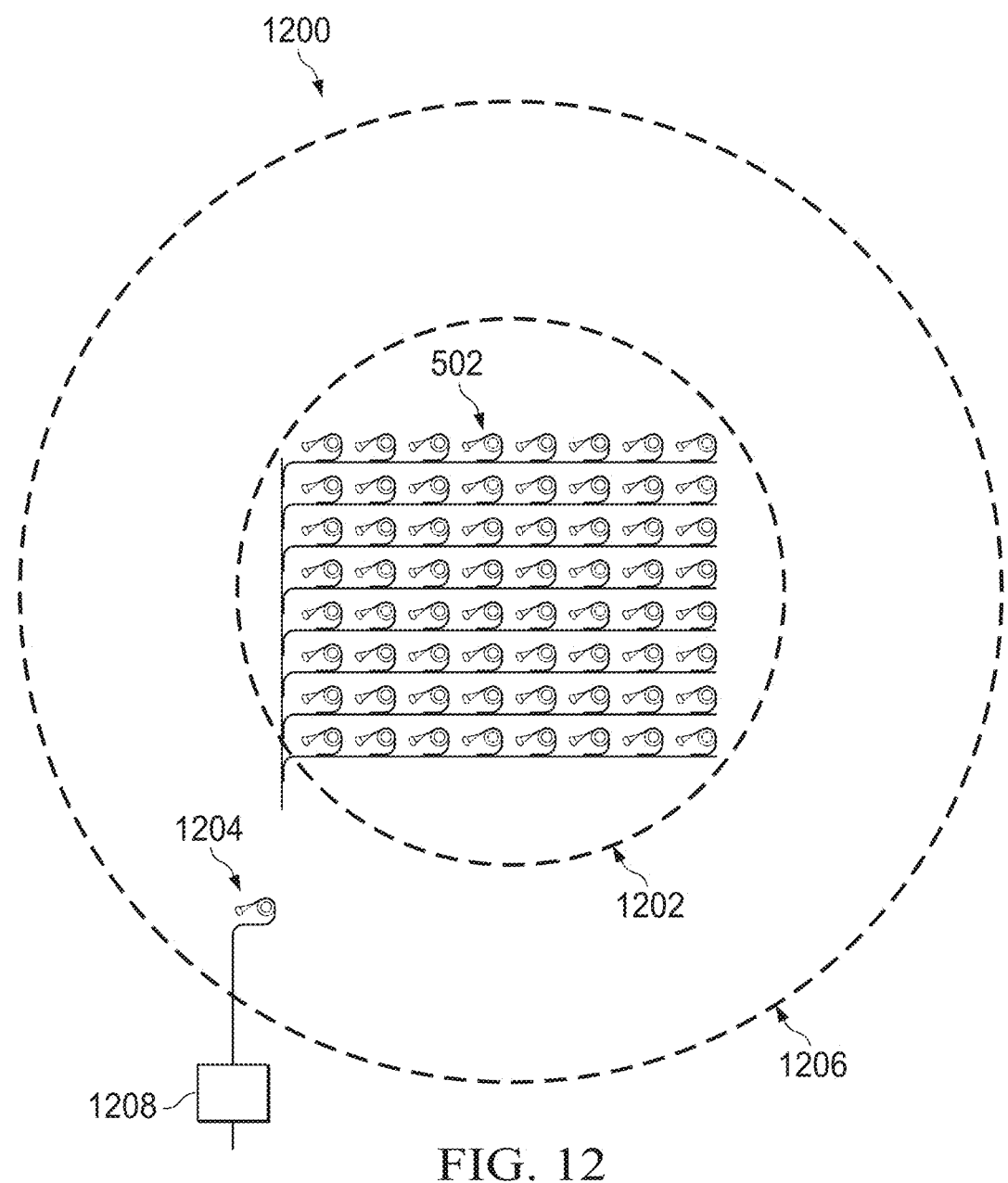
FIG. 12 illustrates a portion of an example layout of an optical phased array to support digital holography-based phasing according to this disclosure.

FIG. 12 illustrates a portion of an example layout 1200 of an optical phased array to support digital holography-based phasing according to this disclosure. The layout 1200 shown here may be used in the OPA 604, which may be implemented within the photonic integrated circuit 402 of the optical device 300. However, the layout 1200 may be used with any other suitable device and in any suitable system.

As shown in FIG. 12, the layout 1200 includes an area 1202 in which the array elements 502 are positioned. This area 1202 may include all of the array elements 502 or a subset of the array elements 502 for the OPA 604. The layout 1200 also includes an additional antenna element 1204 that is positioned outside the collection of array elements 502 within an area 1206 around or proximate to the array elements 502. The additional antenna element 1204 is positioned within the same plane as the array elements 502 in order to support phasing control of the array elements 502. The additional antenna element 1204 here is positioned at an appropriate distance from the area 1202 and operates as a local oscillator to produce a reference signal to allow for digital holography Fourier processing. In some embodiments, the additional antenna element 1204 can be selectively operated using a switch 1208 (such as a thermal switch) so that the additional antenna element 1204 is used only when calibrating the array elements 502. The additional antenna element 1204 is used as described below to support digital holography-based phasing of the array elements 502.

Although FIG. 12 illustrates a portion of one example layout 1200 of an optical phased array to support digital holography-based phasing, various changes may be made to FIG. 12. For example, the area 1206 around the array elements 502 may include various other components of the OPA, and the additional antenna element 1204 can be positioned in an otherwise-unoccupied spot in the area 1206.

Figure 13:
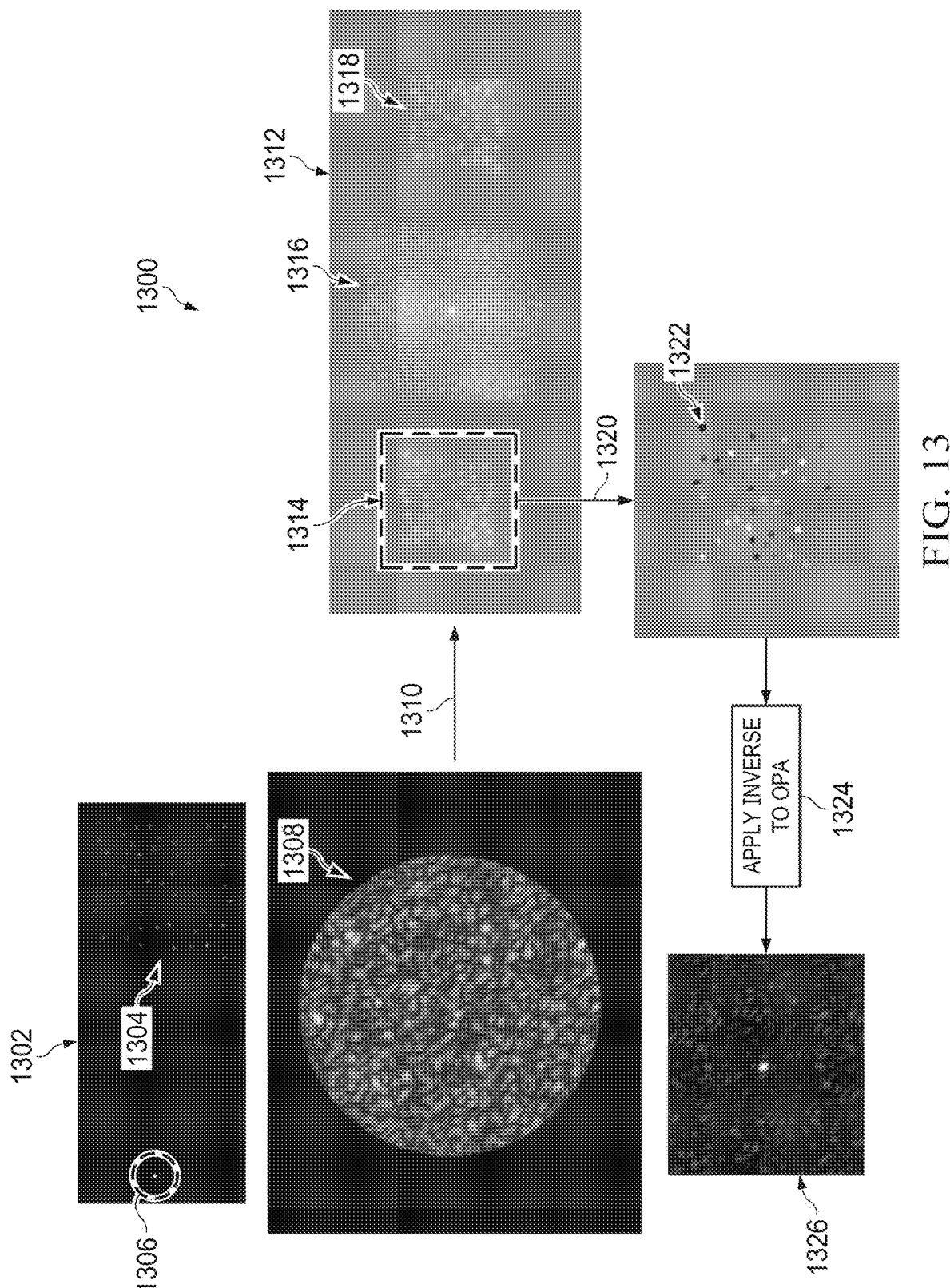
FIG. 13 illustrates an example process for performing digital holography-based phasing according to this disclosure.

FIG. 13 illustrates an example process 1300 for performing digital holography-based phasing according to this disclosure. The process 1300 shown here may rely on the presence of the additional antenna element 1204 in the layout 1200 of FIG. 12. However, the process 1300 may be used with any other suitable device and in any suitable system.

Digital holography is essentially a spatial heterodyne approach in the far-field, where a single measurement (such as a single image capture) provides the phase of each of multiple antenna elements. In FIG. 13, a view 1302 represents a scene that one might observe while actually looking at the layout 1200 at a close distance (referred to as the near-field). In this example, the view 1302 includes a collection 1304 of spots, each of which represents the output from one of the array elements 502. The view 1302 also includes an area 1306 with an additional spot, which represents the output of the additional antenna element 1204. The outputs from the array elements 502 and the additional antenna element 1204 form a far-field image 1308, which represents an image captured at some distance from the array elements 502. The image 1308 here may be referred to as a "de-phased" image since the array elements 502 may have a predefined, random, or other phase control or no phase control being applied to the array elements 502 that does not result in a well-defined beam being generated and captured in the image 1308. The presence of the additional antenna element 1204 acting as a local oscillator here causes fringes or other effects in the image 1308.

A transform 1310 (such as a fast Fourier transform) is applied to the image 1308 in order to produce complex pupil data 1312, which defines the real and imaginary components of the data contained in the image 1308. One portion 1314 of the complex pupil data 1312 can be selected, while a portion 1316 (which defines the auto-correlation of the array elements 502) and a portion 1318 (which defines the inverse of the portion 1314) can be discarded. A transform 1320 can be applied to the portion 1314 of the complex pupil data 1312, such as a transform function of arctan(Im/Re) (where Im represents the imaginary component and Re represents the real component of the image data). This converts the portion 1314 of the complex pupil data 1312 into phase data 1322, where the phase data 1322 identifies the phases of the array elements 502 in radians relative to the local oscillator (the additional antenna element 1204). A function 1324 applies an inverse of the phase data 1322 to the array elements 502 of the OPA to provide phasing control, and a new far-field image 1326 may be captured after the phasing control has been performed. As can be seen here, the phasing control effectively phases the array elements 502 of the OPA so that the array elements 502 form a strong optical beam in the far-field.

Note that the distance of the additional antenna element 1204 from the array elements 502 can affect the separation of the portions 1312-1316 of the complex pupil data 1312. Thus, the additional antenna element 1204 may typically be positioned so that the portions 1312-1316 of the complex pupil data 1312 do not overlap. Also note that multiple wavelengths may be supported by the array elements 502 and the additional antenna element 1204 to produce true time delay information, effectively supporting as a multi-wavelength distance measurement technique. Further, note that the process 1300 shown in FIG. 13 may be performed at any suitable time(s). For instance, in some cases, the process 1300 may be performed in a factory or other controlled setting. In other cases, the process 1300 may be performed during use of a device or system that incorporates an OPA.

Although FIG. 13 illustrates one example of a process 1300 for performing digital holography-based phasing, various changes may be made to FIG. 13. For example, the specific view, images, and phase data here are for illustration only and can vary based on a number of factors, such as the number of array elements 502 and the position of the additional antenna element 1204.

Figure 14:
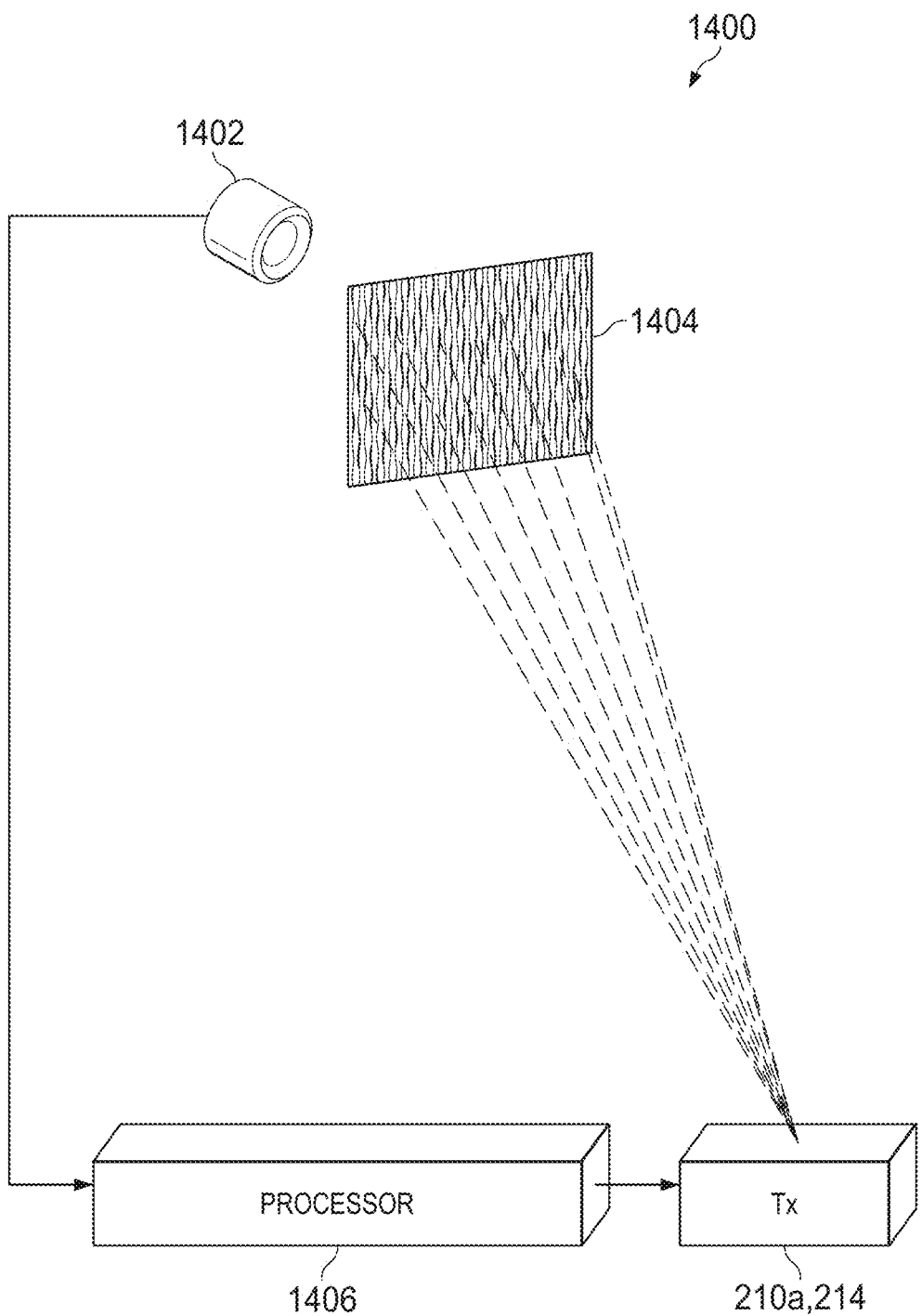
FIGS. 14 and 15 illustrate example systems supporting digital holography-based phasing according to this disclosure.
Figure 15:
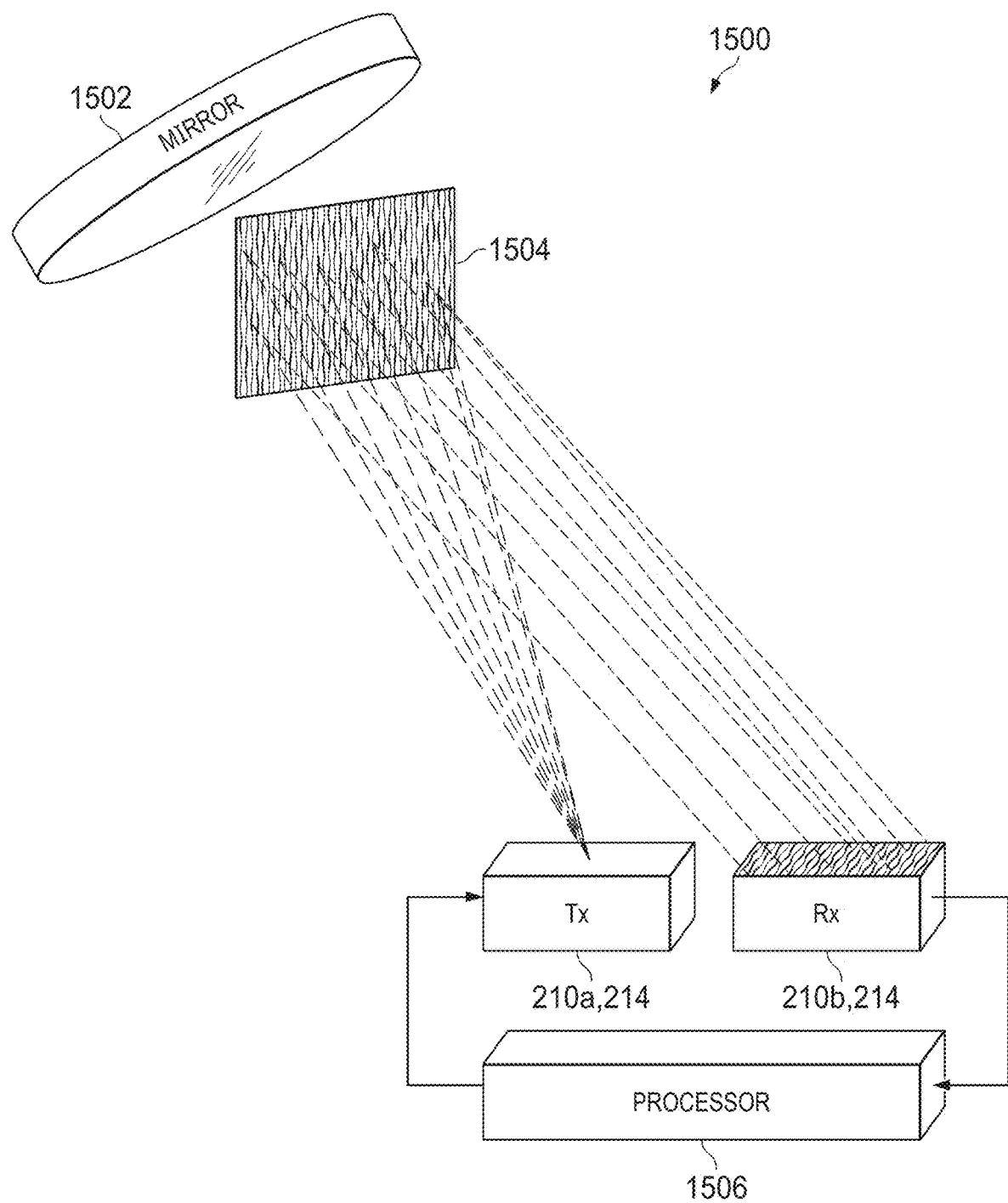

FIGS. 14 and 15 illustrate example systems 1400 and 1500 supporting digital holography-based phasing according to this disclosure. These systems 1400 and 1500 support the use of the process 1300 using the additional antenna element 1204 in the layout 1200 of FIG. 12. However, the systems 1400 and 1500 may be used with any other suitable device and in any suitable system.

As shown in FIG. 14, an optical transmitter 210a or optical transceiver 214 transmits outgoing optical signals, which are captured by a camera 1402 to produce a far-field image 1404. The image 1404 is fed back to a processor 1406, such as one or more microprocessors, microcontrollers, digital signal processors (DSPs), field programmable gate arrays (FPGAs), application-specific integrated circuits (ASICs), or discrete circuitry. The processor 1406 can perform the transforms 1310 and 1320 and the function 1324 of the process 1300, and the calculated phase changes can be provided to the optical transmitter 210a or optical transceiver 214 for phasing control. Note that this may occur any desired number of times in order to achieve suitable phasing of an array.

As shown in FIG. 15, an optical transmitter 210a or optical transceiver 214 transmits outgoing optical signals, which are reflected from a mirror 1502 as a far-field image 1504. The image 1504 is then received at an optical receiver 210b or optical transceiver 214. The image 1504 as captured by the optical receiver 210b or optical transceiver 214 is provided to a processor 1506, such as one or more microprocessors, microcontrollers, DSPs, FPGAs, ASICs, or discrete circuitry. The processor 1506 can perform the transforms 1310 and 1320 and the function 1324 of the process 1300, and the calculated phase changes can be provided to the optical transmitter 210a, optical receiver 210b, or optical transceiver 214 for phasing control. Again, note that this may occur any desired number of times in order to achieve suitable phasing of an array.

Although FIGS. 14 and 15 illustrate examples of systems 1400 and 1500 supporting digital holography-based phasing, various changes may be made to FIGS. 14 and 15. For example, other arrangements of components may be used to capture images that are processed to support digital holography-based phasing of an OPA.

Figure 16:
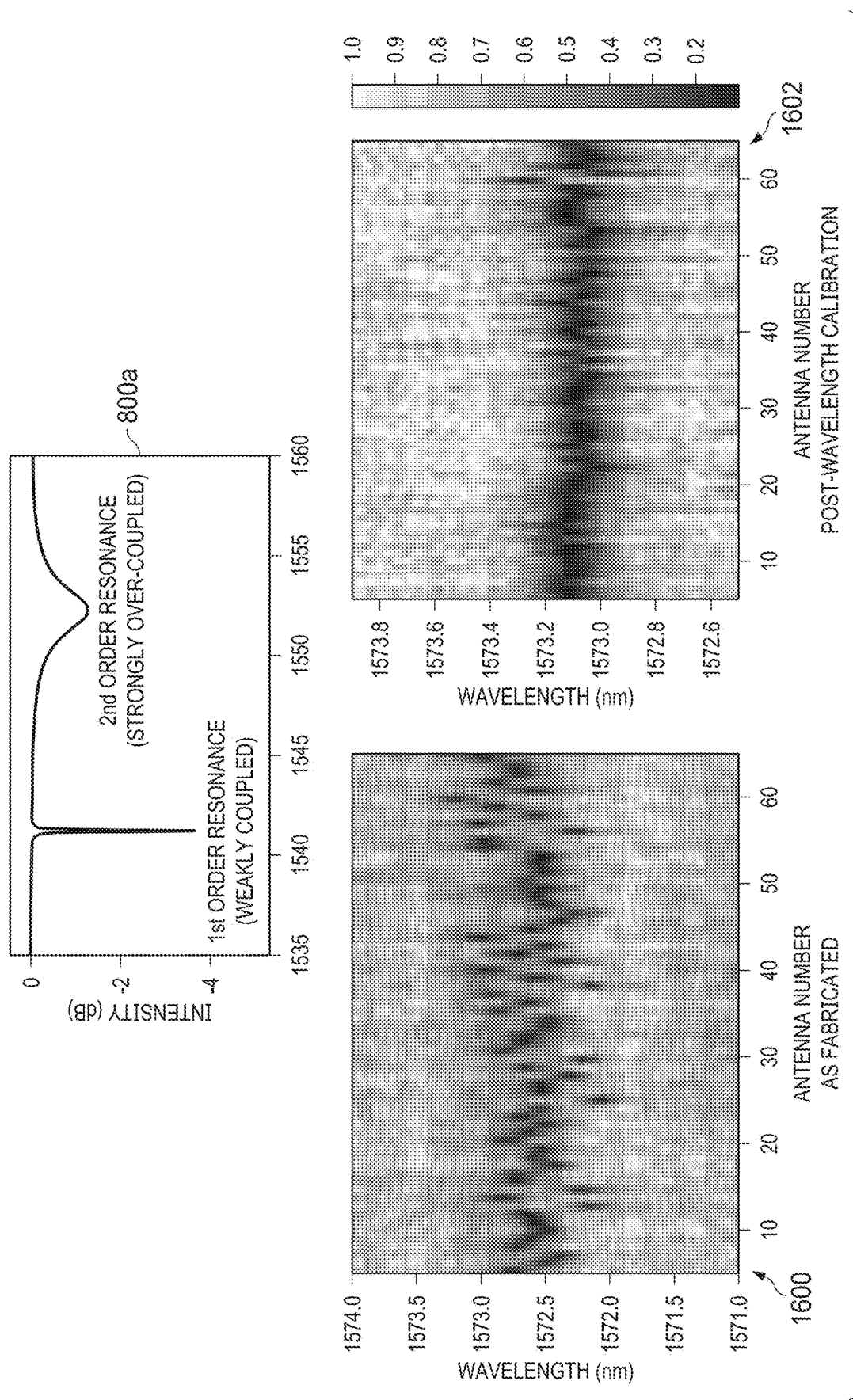
FIGS. 16 and 17 illustrate an example calibration technique for an optical phased array according to this disclosure.
Figure 17:
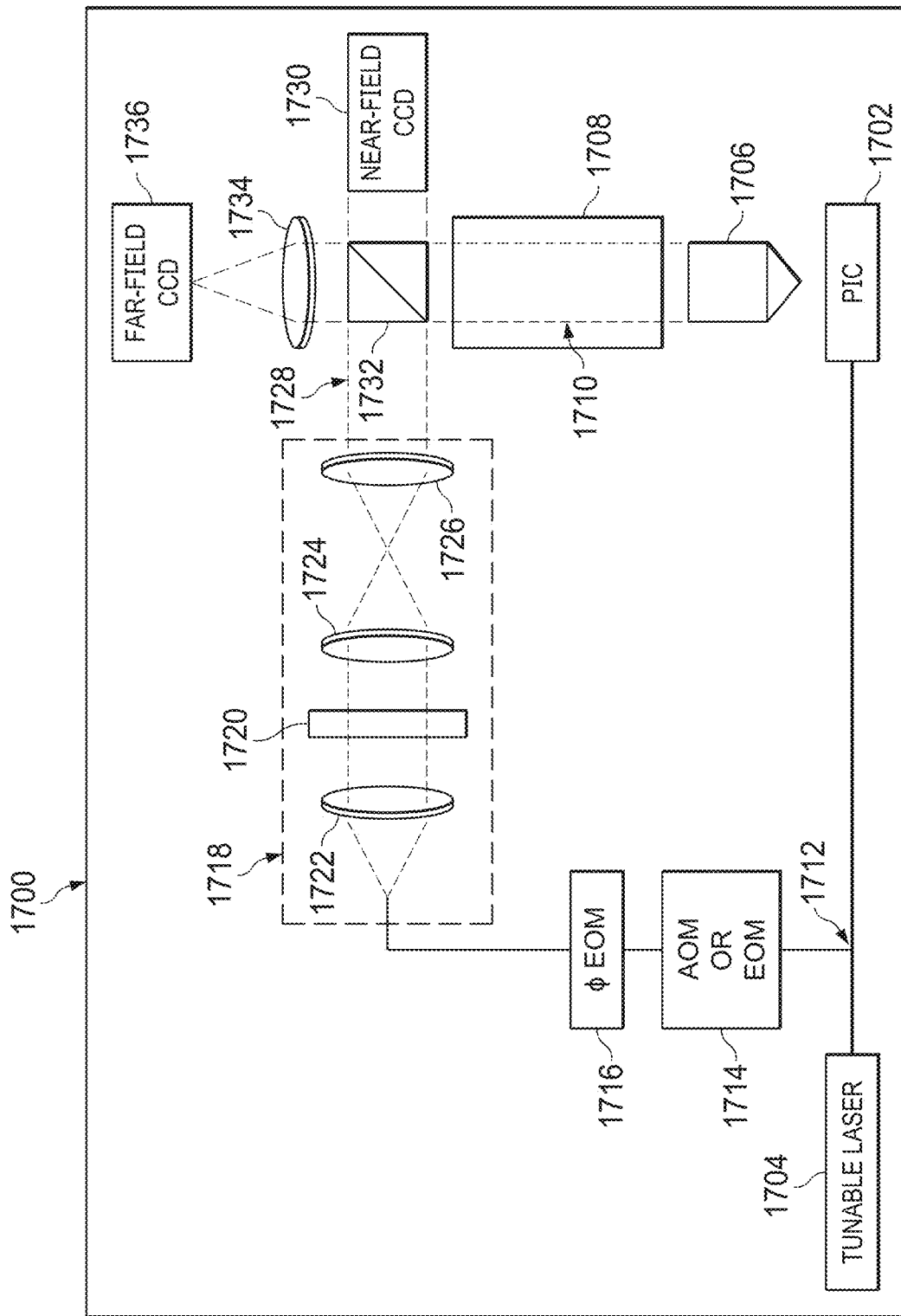

FIGS. 16 and 17 illustrate an example calibration technique for an optical phased array according to this disclosure. As noted above, in some cases, calibration of an OPA may occur in multiple stages, such as when thermal resonators are used as the phase modulators 508. The first stage of the calibration technique involves a coarse wavelength calibration that aligns the first-order resonances of the thermal resonators used as the phase modulators 508. In FIG. 16, a portion 800a of the graph 800 from FIG. 8 is shown, where the first-order resonance is associated with a large dip in output intensity for an array element 502. This dip in intensity can be sensed by a camera (such as the camera 1402) in the near-field in order to identify the first-order resonant frequency of each phase modulator 508. Thus, a processor (such as the processor 1406 or 1506) or other controller (such as one or more microprocessors, microcontrollers, digital signal processors, field programmable gate arrays, application-specific integrated circuits, or discrete circuitry on the electronic control board 408 or other location) can cause the DRIIC cells 512 to perform phase modulation sweeps (voltage sweeps) for the modulators 508 to identify the voltages that cause the first-order resonant frequencies of the phase modulators 508 to align.

Graphs 1600 and 1602 in FIG. 16 illustrate the effects of this alignment process on the array elements 502 of an OPA. As can be seen in the graph 1600, the array elements 502 as fabricated have more widely-varying first-order resonant frequencies as fabricated. This may be due to various factors, such as manufacturing tolerances. As can be seen in the graph 1602, the array elements 502 after calibration have much more similar first-order resonant frequencies. Because of this, the second-order resonant frequencies of the array elements 502 (which are utilized for phase control) may also be more similar to one another.

After coarse wavelength calibration has occurred, the architecture 1700 shown in FIG. 17 supports the second stage of the calibration process in which heterodyne coherent mixing in the near-field is used. In this example, a PIC 1702 (which may represent the PIC 402) represents or includes the OPA being calibrated. A tunable laser 1704 generates a tunable input beam, most of which is provided to the PIC 1702 and causes the PIC 1702 to produce an optical output. The optical output in this example passes through a microscope objective lens 1706 and a tube lens 1708, which produces a first optical beam 1710. The first optical beam 1710 is composed of the optical signals produced by the array elements 502 of the OPA.

A fiber tap 1712 splits off a portion of the tunable input beam from the laser 1704, and this portion of the tunable input beam represents a reference signal used in the architecture 1700. An amplitude or intensity modulator 1714, such as an acousto-optic modulator (AOM) or an electro-optic modulator (EOM), can be used to turn the reference signal on and off in order to collect background and antenna emission intensities as a function of the phase tuning of the modulators 508. A phase modulator 1716 can shift the phase of the reference signal as modified by the modulator 1714 by $\theta$ and $\theta+\pi/2$. This helps to maximize the contrast ratio of $I(\theta)/I(\theta+\pi/2)$ of the antenna phase to the reference signal as the phase angle $\theta$ is scanned (where $I(\cdot)$ represents intensity). This allows a pure phase shift to be determined, which decouples the amplitude effects associated with phase tuning of thermal resonators (note that decoupling of amplitude and phase effects is not required if PN junction micro-ring modulators are used for phase control).

A mask assembly 1718 may optionally be used here to apply a mask to the phase-shifted reference signal, which allows for the generation of a dark field image with minimal background. The dark field with an image-relayed mask can therefore be used for heterodyne mixing to reduce the measurement noise floor. In this example, the mask assembly 1718 includes a mask 1720, which helps to ensure that there is minimal background in the dark field image. In some cases, the mask 1720 may be programmable, such as when the mask 1720 represents a spatial light modulator. A lens 1722 expands the reference signal prior to passing through the mask 1720, and lenses 1724 and 1726 invert the reference signal after passing through the mask 1720 to produce a second optical beam 1728 representing the dark field image.

The first optical beam 1710 and the second optical beam 1728 are mixed, and at least a portion of the mixed beam is provided to a near-field imaging sensor 1730. The imaging sensor 1730 can capture one or more images of the mixed beam, and the image(s) can be used to identify whether or not the array elements of the PIC 1702 are properly in phase. The mixing of the beams 1710 and 1728 may be performed using any suitable optical device(s). If desired, the mixing may be performed using a beam splitter 1732, which also allows another portion of the mixed beam to be focused by a lens 1734 onto a far-field imaging sensor 1736. The imaging sensor 1736 can capture one or more images of the mixed beam from the lens 1734, which again allows the image(s) to be used to identify whether or not the array elements of the PIC 1702 are properly in phase. The imaging sensors 1730 and 1736 represent any suitable devices configured to capture optical information, such as charge-coupled devices (CCDs) or other sensors. Among other things, the information captured by the imaging sensor(s) 1730 and 1736 can be used to identify how the phases and amplitudes of signals generated by the array elements of the PIC 1702 vary as the phase angle 9 is scanned. This information can be used to identify phase curves and emitter amplitudes for the array elements of the PIC 1702. In some embodiments, such phase curves and emitter amplitudes may serve as the calibration data.

Note that in the design of the supercells 626, such as in the portion 638 shown in FIG. 9, the antenna elements 504 can be arranged in a Manhattan layout, which means the path length to each antenna element 504 is ideally matched to $x+m*2\pi$. Here, x refers to some offset distance, and m is a positive integer. This design helps to ensure that outgoing optical signals are nominally in-phase with one another when they arrive at the antenna elements 504 at the peak resonance of the thermal resonators forming the phase modulators 508. This helps to simplify the calibration and can reduce or minimize amplitude modulations over the array.

The calibration data (such as the phase curves and emitter amplitudes) represents information defining how the array elements 502 respond to the signals driving the phase modulators 508, which allows the array elements 502 to be driven appropriately in order to produce a desired beam forming, beam steering, wavefront reconstruction, or other effect. Once generated, the calibration data can be stored for later use. For example, at least some of the calibration data may be stored in the registers 514 of the DRIIC cells 512. As another example, at least some of the calibration data may be stored in one or more lookup tables. In general, the calibration data may be stored and later used in any suitable manner.

Although FIGS. 16 and 17 illustrate one example of a calibration technique for an optical phased array, various changes may be made to FIGS. 16 and 17. For example, the coarse wavelength alignment may be omitted. Also, any other suitable technique may be used to align the phases of array elements in an optical phased array.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive (HDD), a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present disclosure should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   generating a mixed optical beam comprising a combination of (i) an output optical beam produced by an optical phased array and (ii) a reference optical beam, the optical phased array comprising multiple array elements, each array element comprising an antenna element and a phase modulator;
   capturing near-field measurements of the mixed optical beam;
   generating calibration data based on the near-field measurements, the calibration data identifying phase and amplitude responses of the array elements; and
   storing the calibration data.

2. The method of claim 1, further comprising:
   prior to generating the mixed optical beam, aligning first-order resonances of the phase modulators in order to provide coarse alignment of second-order resonances of the phase modulators.

3. The method of claim 2, wherein each of the phase modulators comprises a thermal resonator comprising a micro-ring resonator and a heater.

4. The method of claim 1, wherein:
   the reference optical beam represents a portion of an optical beam used to drive the optical phased array during generation of the output optical beam; and
   the mixed optical beam is produced as a result of heterodyne coherent mixing.

5. The method of claim 1, wherein:
   the reference optical beam represents a portion of an optical beam used to drive the optical phased array during generation of the output optical beam; and
   the method further comprises applying a mask to a modulated version of the reference optical beam to provide a dark field with an image-relayed mask.

6. The method of claim 1, further comprising:
   identifying one or more of the array elements that are defective based on the near-field measurements.

7. The method of claim 1, wherein:
   the optical phased array is divided into multiple supercells, each supercell comprising a subset of the array elements; and
   the capturing, generating, and storing operations are repeated for each supercell.

8. An apparatus comprising:
   at least one processor configured to:
   capture near-field measurements of a mixed optical beam comprising a combination of (i) an output optical beam produced by an optical phased array and (ii) a reference optical beam, the optical phased array comprising multiple array elements, each array element comprising an antenna element and a phase modulator;
   generate calibration data based on the near-field measurements, the calibration data identifying phase and amplitude responses of the array elements; and
   store the calibration data.

9. The apparatus of claim 8, wherein the at least one processor is further configured, prior to capturing the near-field measurements, to align first-order resonances of the phase modulators in order to provide coarse alignment of second-order resonances of the phase modulators.

10. The apparatus of claim 9, wherein each of the phase modulators comprises a thermal resonator comprising a micro-ring resonator and a heater.

11. The apparatus of claim 8, wherein:
    the reference optical beam represents a portion of an optical beam used to drive the optical phased array during generation of the output optical beam; and
    the mixed optical beam is produced as a result of heterodyne coherent mixing.

12. The apparatus of claim 8, wherein:
    the reference optical beam represents a portion of an optical beam used to drive the optical phased array during generation of the output optical beam; and
    a mask is applied to a modulated version of the reference optical beam to provide a dark field with an image-relayed mask.

13. The apparatus of claim 8, wherein the at least one processor is further configured to identify one or more of the array elements that are defective based on the near-field measurements.

14. The apparatus of claim 8, wherein:
    the optical phased array is divided into multiple supercells, each supercell comprising a subset of the array elements; and
    the at least one processor is configured to capture the near-field measurements, generate the calibration data, and store the calibration data for each supercell.

15. A non-transitory computer readable medium containing instructions that when executed cause at least one processor to:
    capture near-field measurements of a mixed optical beam comprising a combination of (i) an output optical beam produced by an optical phased array and (ii) a reference optical beam, the optical phased array comprising multiple array elements, each array element comprising an antenna element and a phase modulator;
    generate calibration data based on the near-field measurements, the calibration data identifying phase and amplitude responses of the array elements; and
    store the calibration data.

16. The non-transitory computer readable medium of claim 15, further containing instructions that when executed cause the at least one processor, prior to capturing the near-field measurements, to align first-order resonances of the phase modulators in order to provide coarse alignment of second-order resonances of the phase modulators.

17. The non-transitory computer readable medium of claim 15, wherein:
   the reference optical beam represents a portion of an optical beam used to drive the optical phased array during generation of the output optical beam; and
   the mixed optical beam is produced as a result of heterodyne coherent mixing.

18. The non-transitory computer readable medium of claim 15, wherein:
   the reference optical beam represents a portion of an optical beam used to drive the optical phased array during generation of the output optical beam; and
   a mask is applied to a modulated version of the reference optical beam to provide a dark field with an image-relayed mask.

19. The non-transitory computer readable medium of claim 15, further containing instructions that when executed cause the at least one processor to identify one or more of the array elements that are defective based on the near-field measurements.

20. The non-transitory computer readable medium of claim 15, wherein:
   the optical phased array is divided into multiple supercells, each supercell comprising a subset of the array elements; and
   the medium further contains instructions that cause the at least one processor to capture the near-field measurements, generate the calibration data, and store the calibration data for each supercell.

* * * * *